(12) United States Patent
Moghadam et al.

(10) Patent No.: US 10,586,385 B2
(45) Date of Patent: Mar. 10, 2020

(54) STRUCTURE MODELLING

(71) Applicant: Commonwealth Scientific and Industrial Research Organisation, Acton, Australian Capital Territory (AU)

(72) Inventors: Peyman Moghadam, Acton (AU); Thomas Lowe, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 27 days.

(21) Appl. No.: 15/555,123

(22) PCT Filed: Mar. 4, 2016

(86) PCT No.: PCT/AU2016/050148
§ 371 (c)(1),
(2) Date: Sep. 1, 2017

(87) PCT Pub. No.: WO2016/138567
PCT Pub. Date: Sep. 9, 2016

(65) Prior Publication Data
US 2018/0075648 A1    Mar. 15, 2018

(30) Foreign Application Priority Data

Mar. 5, 2015    (AU) ................................ 2015900779

(51) Int. Cl.
*G06T 17/00*    (2006.01)
*G06T 17/05*    (2011.01)
(Continued)

(52) U.S. Cl.
CPC ............ *G06T 17/05* (2013.01); *G01S 7/4808* (2013.01); *G01S 17/023* (2013.01); *G01S 17/89* (2013.01);
(Continued)

(58) Field of Classification Search
CPC ...................................................... G06T 7/187
See application file for complete search history.

(56) References Cited

U.S. PATENT DOCUMENTS

| 8,538,442 B1 * | 9/2013 | Ettinger .............. H04W 40/244 455/446 |
| 8,625,854 B2 | 1/2014 | Valkenburg et al. |

(Continued)

FOREIGN PATENT DOCUMENTS

| EP | 0895577 | 4/2005 |
| WO | 2012012819 A1 | 2/2012 |

(Continued)

OTHER PUBLICATIONS

Filliat et al., "RGBD object recognition and visual texture classification for indoor semantic mapping", 2012, pp. 127-132.*

(Continued)

*Primary Examiner* — Phong X Nguyen
(74) *Attorney, Agent, or Firm* — Merchant & Gould P.C.

(57) ABSTRACT

A system for generating a three-dimensional geometric model of a structure, the system including a portable sensing device that can be transported through the structure, wherein the sensing device includes one or more sensors that generate sensor data at least partially indicative of a position of the sensing device relative to at least part of the structure and at least one electronic processing device that determines a captured map of at least part of the structure using the sensor data, determines at least part of a path traversed by the sensing device using the sensor data, identifies one or more model features using the part of the path and the captured map and generates a three-dimensional geometric model of the structure using the model features.

21 Claims, 20 Drawing Sheets
(10 of 20 Drawing Sheet(s) Filed in Color)

(51) Int. Cl.
  *G06K 9/00* (2006.01)
  *G01S 7/48* (2006.01)
  *G01S 17/89* (2020.01)
  *G06T 17/10* (2006.01)
  *G01S 17/02* (2020.01)
  *G06T 19/20* (2011.01)
  *G01S 17/42* (2006.01)

(52) U.S. Cl.
  CPC ..... *G06K 9/00201* (2013.01); *G06K 9/00664* (2013.01); *G06T 17/10* (2013.01); *G06T 19/20* (2013.01); *G01S 17/42* (2013.01)

(56) References Cited

U.S. PATENT DOCUMENTS

| | | | | |
|---|---|---|---|---|
| 9,119,670 | B2* | 9/2015 | Yang | A61B 5/055 |
| 9,547,838 | B2* | 1/2017 | Larsen | G06T 15/04 |
| 9,648,297 | B1* | 5/2017 | Ettinger | H04N 13/106 |
| 9,659,406 | B2* | 5/2017 | Arcas | G06T 17/00 |
| 9,857,470 | B2* | 1/2018 | Hilliges | G01S 17/89 |
| 10,008,027 | B1* | 6/2018 | Baker | G06T 7/0051 |
| 2005/0249399 | A1 | 11/2005 | Tek et al. | |
| 2009/0171627 | A1* | 7/2009 | Olson | G06T 17/00 |
| | | | | 703/1 |
| 2009/0289938 | A1 | 11/2009 | Paulsen | |
| 2010/0189333 | A1* | 7/2010 | Beck | E06B 5/161 |
| | | | | 382/131 |
| 2010/0245344 | A1* | 9/2010 | Chen | G06T 19/00 |
| | | | | 345/419 |
| 2011/0007138 | A1 | 1/2011 | Zhang et al. | |
| 2011/0033110 | A1* | 2/2011 | Shimamura | G01C 11/06 |
| | | | | 382/173 |
| 2011/0148924 | A1* | 6/2011 | Tapley | G06F 3/011 |
| | | | | 345/634 |
| 2012/0194516 | A1* | 8/2012 | Newcombe | G06T 17/00 |
| | | | | 345/420 |
| 2013/0083964 | A1* | 4/2013 | Morris | G01S 17/023 |
| | | | | 382/103 |
| 2013/0293532 | A1* | 11/2013 | Vaddadi | G06T 15/005 |
| | | | | 345/419 |
| 2014/0043331 | A1* | 2/2014 | Makinen | G06T 15/40 |
| | | | | 345/424 |
| 2014/0043433 | A1* | 2/2014 | Scavezze | G06T 19/006 |
| | | | | 348/42 |
| 2014/0043436 | A1* | 2/2014 | Bell | G06T 19/20 |
| | | | | 348/46 |
| 2014/0192050 | A1 | 7/2014 | Qui et al. | |
| 2014/0267627 | A1* | 9/2014 | Freeman | G01S 17/023 |
| | | | | 348/47 |
| 2014/0301633 | A1 | 10/2014 | Furukawa et al. | |
| 2015/0130807 | A1* | 5/2015 | Kunen | G06T 19/20 |
| | | | | 345/427 |
| 2015/0269775 | A1* | 9/2015 | Thompson | G06T 5/30 |
| | | | | 345/420 |
| 2015/0294189 | A1* | 10/2015 | Benhimane | G06K 9/623 |
| | | | | 382/195 |
| 2016/0154999 | A1* | 6/2016 | Fan | G06K 9/00201 |
| | | | | 382/103 |

FOREIGN PATENT DOCUMENTS

| | | |
|---|---|---|
| WO | 2013059160 A1 | 4/2013 |
| WO | 201315564 A1 | 10/2013 |
| WO | 2014169238 A1 | 10/2014 |

OTHER PUBLICATIONS

International Search Report for International Application No. PCT/AU2016/050148 dated May 3, 2016 (4 pages).
International Written Opinion for International Application No. PCT/AU2016/050148 dated May 3, 2016 (4 pages).
Australian Search Information Sheet for PCT/AU2016/050148 completed May 3, 2016 (3 pages).
International Preliminary Report on Patentability for International Application No. PCT/AU2016/050148 dated Sep. 14, 2017 (8 pages).

* cited by examiner

STRUCTURE MODELLING

This application is a National Stage Application of PCT/AU2016/050148, filed 4 Mar. 2016, which claims benefit of Serial No. 2015900779, filed 5 Mar. 2015 in Australia and which applications are incorporated herein by reference. To the extent appropriate, a claim priority is made to each of the above disclosed applications.

BACKGROUND OF THE INVENTION

This invention relates to a method and system for structure modelling and in particular to a method and system for generating a three-dimensional geometric model of a structure, such as the inside of a building or the like.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Three-dimensional (3D) mapping systems, such as mobile or hand-held 3D mapping systems, are being used to capture model of three-dimensional objects, including the internal structure of buildings. Such systems typical use LiDAR range scanners, which measure reflected laser light to find the range of a target, with this information being in turn used to create point clouds.

Examples of arrangements for generating point clouds are described in WO2012/012819 and WO2013/155564, which describe a three-dimensional scanning beam and imaging system that enables economical and efficient three-dimensional scans of an environment. The system includes a ranging apparatus, and a reactive linkage mechanism having a first end connected to the ranging apparatus and a second end connected to an object, such as a handle. In use acceleration of the object with respect to the environment is converted by the reactive linkage mechanism to motion of the ranging apparatus with respect to the object, which increases the field of view of the ranging apparatus with respect to the environment.

Once a point cloud has been generated, it may be visualised anywhere in the world. This is valuable for areas such as forensics, security, maintenance and other areas of work where a scene may change over time. However, whilst point clouds are useful and informative, these typically contain a large amount of unnecessary information, such as the location of each individual scanned point, resulting in high data volumes. Moreover, they lack meaningful information on the structure such as the connectivity, location of walls and a determination of solid and free space volumes. Accordingly, it is typical for point clouds to be processed prior to use in an attempt to generate models representing the spatial information of the scanned objects. This is typically achieved using structure extraction techniques that aim to extract only the structure of buildings within point clouds, or surface reconstruction techniques such as triangulation-based meshing (which will also fit to objects within rooms).

While structure extraction may aid in the generation and analysis of informative building models, it is a difficult task to create a robust algorithm able to extract floors, walls and other structural elements from noisy point cloud data. Some regions of a point cloud may have a low point density while other regions contain a high density. Walls may be filled with clutter during the scanning process, thus resulting in non-planar representations of the walls. Objects may also hide regions of a room with respect to the scanner, resulting in a shadow of empty space behind the objects. Raised floors, half walls (such as dividers), stairwells, windows and multilevel buildings can also hinder the extraction process.

There are currently two main surface extraction techniques, namely polygon (usually triangular) surface fitting and plane fitting. Exterior structure extraction methods generally employ plane fitting techniques which extract the exterior walls and roofs of buildings only. Algorithms such as the Hough Transform technique can then be applied to extract planes from the point data representing walls and roofs by examining which geometric features fit each point. Features that fit a large number of points are then extracted. Although this technique is designed for extracting features in a 2D space, it may be extended in a 3D space to extract features such as planes.

Similar plane fitting methods are used for interior structure extraction, including algorithms such as the Random Sample Analysis (RANSAC) algorithm or Hough Transforms in order to generate planar surfaces from point cloud data. The RANSAC algorithm is an iterative algorithm able to fit planes to sets of data in 3D space consisting of inliers and outliers. Inliers are points that correctly model the structure whereas outliers are points that don't fit the model. By employing classification techniques, the RANSAC algorithm may then be applied to segmented points in order to generate planar surfaces representing the structure of an environment. This method is accomplished by employing Principal Component Analysis (PCA) to find the normals of all points within a point cloud. Using the angles of these normals, a thresholding algorithm is able to segment the points into subsets. The RANSAC algorithm is then used to fit a plane to the subset of points in the segment. The resultant planes are then merged together to create a building model.

Although interior plane fitting techniques may be employed using methods such as Hough Transforms and the RANSAC algorithm, these techniques may still fail in high noise environments where walls, floors, and ceilings are highly occluded by objects.

Alternatively, polygon surface fitting techniques aim to create a smooth mesh of surfaces generated from a 3D point cloud. One method for surface reconstruction on noisy 3D point clouds is to employ a robust triangulation algorithm. This algorithm results in a smooth mesh model of the environment including walls, floors, ceilings and objects. Using a variant of the occupancy grid mapping algorithm, the Voxel Depth Carving algorithm is also able to reconstruct objects in noisy depth images. Reconstructing objects using Voxel Depth Carving usually results in a triangulated mesh representation of the object or environment.

Although polygon surface fitting techniques are able to reconstruct the interior structural surfaces of buildings, these methods will also reconstruct the objects contained within buildings. If a building contained no objects, polygon surface fitting and hybrid techniques may be a good candidate for interior structural extraction. However, since this is generally not the case, polygon surface fitting is not a good solution for the generation of Computer-Aided Design (CAD) style models that represent only the structure of buildings in high noise environments.

US2014/0301633 describes systems and methods for reconstructing a floorplan of a building for generating a three-dimensional model are provided. One aspect of the present disclosure is directed to a computer-implemented method for generating a three-dimensional model of a building. The method includes estimating a floor height and a ceiling height of the building. The method also includes identifying a core region of a two-dimensional graph, the core region corresponding to an interior of the building. The method includes determining a solution path that circumnavigates the core region and minimizes a cost formula, the cost formula providing an edge cost for each of a plurality of edges. The method further includes generating a three-dimensional model of the interior of the building based on the floor height, the ceiling height, and the solution path.

However, this uses a mathematically determined shortest route path, determined in a two dimensional plane, and estimated floor and ceiling heights, and is therefore of limited accuracy.

WO2013/059160 describes systems and methods for acquiring information for a construction site. One system includes a base unit positioned within a construction site by a user. A computer subsystem of the base unit determines a position of the base unit with respect to the construction site. The system also includes a measurement unit moved within the construction site by a user. The measurement unit includes one or more elements configured to interact with light in a known manner. An optical subsystem of the base unit directs light to the element(s) and detects the light after interacting with the element(s). The computer subsystem is configured to determine a position and pose of the measurement unit with respect to the base unit based on the detected light. The measurement unit includes a measurement device used by the measurement unit or the base unit to determine information for the construction site.

However, this system requires the deployment of physical markers within the building in order to accurately locate the base unit, and requires that the base unit is statically deployed relative to the markers when imaging.

US2014/0192050 describes a method for three-dimensional point processing and model generation includes applying a primitive extraction to the data in a point cloud to associate primitive shapes with points within the point cloud, the primitive extraction including, estimating normal vectors for the point cloud, projecting the estimated normal vectors onto a Gaussian sphere, detecting and eliminating point-clusters corresponding to planar areas of the point cloud to obtain a residual Gaussian sphere, detecting great-circle patterns on the residual Gaussian sphere to produce a segmented point cloud, projecting each segment of the segmented point cloud onto respective planes to produce respective two-dimensional point clouds, detecting circle patterns in each two-dimensional point cloud, and processing the circle patterns to determine cylinder parameters for each of a plurality of candidate cylinders, and assembling the candidate cylinders into a three-dimensional surface model of the scene.

However, this is specific to limited scenarios, specifically identifying defined geometric shapes, making this of limited applicability.

WO2014169238 describes methods and arrangements involving portable user devices such smartphones and wearable electronic devices. Some arrangements enable a user to perform an object recognition process in a computationally—and time-efficient manner. Other arrangements enable users and other entities to, either individually or cooperatively, register or enroll physical objects into one or more object registries on which an object recognition process can be performed. Still other arrangements enable users and other entities to, either individually or cooperatively, associate registered or enrolled objects with one or more items of metadata. A great variety of other features and arrangements are also detailed.

However, these techniques are limited to individually scanned discrete objects that are already enrolled, and are not applied more generally to models of undefined structures, such as building interiors.

SUMMARY OF THE PRESENT INVENTION

In one broad form the present invention seeks to provide a system for generating a three-dimensional geometric model of a structure, the system including:
  a) a portable sensing device that can be transported through the structure, wherein the sensing device includes one or more sensors that generate sensor data at least partially indicative of a position of the sensing device relative to at least part of the structure;
  b) at least one electronic processing device that:
    i) determines a captured map of at least part of the structure using the sensor data;
    ii) determines at least part of a path traversed by the sensing device using the sensor data;
    iii) identifies one or more model features using the part of the path and the captured map; and,
    iv) generates a three-dimensional geometric model of the structure using the model features.

Typically the at least one electronic processing device identifies one or more model features at least in part using a volume growing process.

Typically the at least one electronic processing device:
  a) generates a number of seed volumes;
  b) at least one of grows and combines the seed volumes to determine empty volumes; and,
  c) uses the empty volumes at least in part to identify model features.

Typically the at least one processing device defines the seed volumes are relative to at least part of the path.

Typically the at least one processing device defines at least one of a position, shape, location, orientation, size and number of seed volumes.

Typically the at least one electronic processing device performs the volume growing in a ray cloud model of at least part of the structure.

Typically the captured map is a point cloud model, and wherein the at least one electronic processing device creates a ray cloud model using the point cloud model and at least part of the path.

Typically the at least one electronic processing device:
  a) uses the sensor data to determine:
    i) captured points in the structure to thereby generate the point cloud model; and
    ii) a position and orientation of the sensing device relative to the structure to thereby determine the path relative to the point cloud model; and,
  b) creates the ray cloud model based on the position and orientation of points in the point cloud and the position and orientation of the sensing device on the path when the respective point in the point cloud was captured.

Typically the at least one electronic processing device performs volume growing to form empty volumes having boundaries coincident with model features.

Typically the at least one processing device performs volume growing in accordance with at least one of:
  a) a point of interest within the structure;
  b) analysis of at least part of the path; and,
  c) user defined annotations.

Typically the point of interest is indicative of at least one of:
 a) an extent of at least one of a structural feature and object; and,
 b) a type of at least one of a structural feature and object.

Typically the sensor data is indicative of at least one of:
 a) a range of at least part of the structure from the sensing device;
 b) an orientation of the sensing device; and,
 c) a position of the sensing device.

Typically the sensor includes at least one of:
 a) a laser range finder;
 b) an optical imaging device; and,
 c) an inertial sensor.

Typically the system includes an input associated with the portable hand-held sensing device that allows a user to create annotations indicative of points of interest as the user traverses the path.

Typically the system generates annotation data indicative of a point of interest identifier and point of interest location.

Typically the input includes a microphone that generates audio data indicative of utterances of the user, and wherein the at least one electronic processing device uses the audio data to determine annotation data.

Typically the at least one electronic processing device uses speech recognition to determine a point of interest identifier and sensor data captured simultaneously with the audio data to determine a point of interest location.

Typically the at least one processing device uses the annotation data of one or more annotations to determine an extent of a point of interest.

Typically the at least one processing device uses the point of interest identifier to identify a corresponding model feature.

Typically the at least one processing device:
 a) determines a model component using the point of interest data; and,
 b) incorporates the model component into the geometric model of the structure as a model feature.

Typically the at least one electronic processing device:
 a) uses a point of interest identifier to select a number of model components;
 b) compares the model components to the captured map; and,
 c) substitutes at least part of the captured map for one of the model components.

Typically the model features are indicative of at least one of:
 a) structural features including at least one of:
  i) structure boundaries;
  ii) structure surfaces; and,
  iii) structure volumes; and,
 b) objects associated with the structure.

Typically the at least one electronic processing device:
 a) identifies structural features within the captured map; and,
 b) identifies objects associated with the structure at least in part using at least one of:
  i) structural features within the captured map;
  ii) points of interest within the captured map; and,
  iii) user defined annotations.

Typically the at least one electronic processing device:
 a) removes at least part of the captured map corresponding to at least some structural features from the captured map; and,
 b) identifies objects from remaining parts of the captured map.

Typically the at least one electronic processing device:
 a) determines at least part of the captured map corresponding to an object;
 b) determines a user defined annotation associated with the at least part of the captured map; and,
 c) uses the annotation to identify the object.

Typically the at least one electronic processing device:
 a) determines a gravity vector orientation with respect to the captured map using at least one structural feature; and,
 b) identifies objects at least in part using the gravity vector.

Typically the at least one electronic processing device identifies surfaces within defined distances of the path to identify at least one of floor, ceiling and wall planes.

In one broad form the present invention seeks to provide a method for generating a three-dimensional geometric model of a structure, the method including:
 a) obtaining, from a mobile sensing device transported through the structure, sensor data at least partially indicative of a position of the sensing device relative to at least part of the structure; and,
 b) in at least one electronic processing device:
  i) determining a captured map of at least part of the structure using the sensor data;
  ii) determining at least part of the path traversed by the sensing device using the sensor data;
  iii) identifying one or more model features using the part of the path and the captured map; and,
  iv) generating a three-dimensional geometric model of the structure using the model features.

BRIEF DESCRIPTION OF THE DRAWINGS

The patent application file contains at least one drawing executed in color. Copies of this patent application publication with color drawing(s) will be provided by the Office upon request and payment of the necessary fee.

An example of the present invention will now be described with reference to the accompanying drawings, in which.

DETAILED DESCRIPTION OF THE PREFERRED EMBODIMENTS

Figure 1:
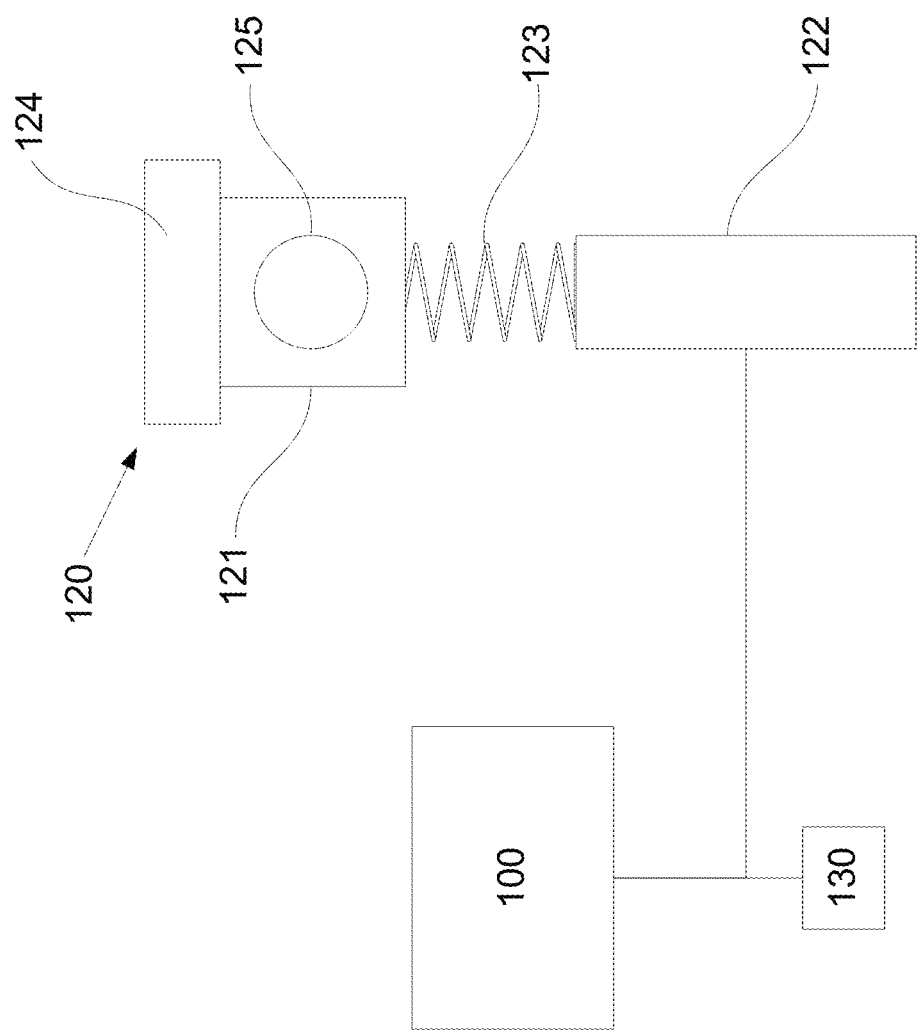
FIG. 1 is a schematic diagram of an example of apparatus for generating a three-dimensional geometric model of a structure.

An example of a system for generating three-dimensional geometric models of structures will now be described with reference to FIG. 1.

For the purpose of illustration, throughout the following the term "captured map" will be understood to include a three-dimensional map or model of a structure that is based on captured sensor data obtained from the sensing device. The captured map is typically in the form of a point cloud, which is a set of data points in a coordinate system that typically corresponds to locations of surface points of the structure or objects contained therein. The term "geometric model" refers to a model of the structure that is derived from the captured model, and can include an interpolated, extrapolated or approximated geometric model. In one example, this is in the form of a polygonal or polyhedral structure model, mesh model, CAD model, or the like.

In this example, the system includes a portable sensing device 120, which includes sensors that generate sensor data at least partially indicative of a position of the sensing device relative to at least part of the structure.

In one specific example, the sensing device includes at first housing 121 coupled to a second housing in the form of a handle 122, via a mechanical linkage, such as a spring 123. The first housing 121 incorporates a variety of sensors, such as to the laser scanner 124 and an optional optical sensing device, in the form of a camera 125. The first housing 121 can also typically incorporate inertial sensors (not shown). In use the sensing device can be held by the handle 122, allowing the first housing 121 to move relative to the handle 122, so that the laser scanner 124 scans the surrounding environment allowing range data indicative of the range of the structure from the sensing device to be captured.

It will be appreciated that in this example the apparatus can then correspond to apparatus similar to that described in WO2012/012819 and WO2013/155564, the contents of which are incorporated herein by reference. A commercial embodiment of such a sensing device is the "Zebedee" handheld 3-D mapping system produced by CSIRO Autonomous Division.

The Zebedee device includes a two-dimensional (2D) LiDAR range scanner, an Inertial Measurement Unit (IMU) spring mounted on a handle. When an operator moves with the device, the scanner loosely oscillates on the spring, producing a rotation that extends the LiDAR's 2D field of view into a 3D view of the environment. The IMU along with a Simultaneous Localization and Mapping (SLAM) solution keep track of the environment and position of the device without the need for an absolute positioning system such as Global Positioning System (GPS). Once a scan is complete, the data may be processed to produce a 3D point cloud of the area mapped by the operator.

It will be appreciated however that this is not intended to be limiting and any suitable sensing device capable of capturing data, which can in turn be used to determine a position of the sensing device relative to the structure can be used. In this regard, a number of smart phones in commercial development include stereoscopic cameras, which when used with suitable processing can produce range data, and the position of the sensing device for example through inbuilt position and orientation sensing, and/or through appropriate image processing. Other suitable processing, such as monocular SLAM, or the like could be used.

In one example, the sensing device is handheld, and carried by a user, although this is not essential. For example, the sensing device could be attached to or worn by a user, for example, in the form of a watch or glass mounted device, backpack or the like. Additionally and/or alternatively the sensing device could be coupled to or carried by a trolley, cart, robotic vehicle, or the like.

The system further incorporates at least one electronic processing device 110. The electronic processing device could be of any suitable form that is capable of obtaining and interpreting sensor data acquired by the sensing device. This could include a microprocessor, microchip processor, logic gate configuration, firmware optionally associated with implementing logic such as an FPGA (Field Programmable Gate Array), or any other electronic device, system or arrangement.

In one example, the processing device is part of a processing system, separate from, but in communication with the sensing device 120, such as a computer system or the like. However, this is not essential, and the processing device could be incorporated into the sensing device. Additionally, and/or alternatively, at least one of the processing devices could be part of a distributed processing arrangement, with some of the functionality being performed on board the portable handheld sensing device 120 and other functionality being provided remote thereto, for example on a remote computer system or the like.

As will be described in more detail below, the system may also include an additional input 130, allowing the operator to provide annotations. The additional input 130 can be part of a processing system incorporating the processing device 110, or alternatively could be integrated into the sensing device 120, or provided as a separate input as will be described in more detail below.

Figure 2:
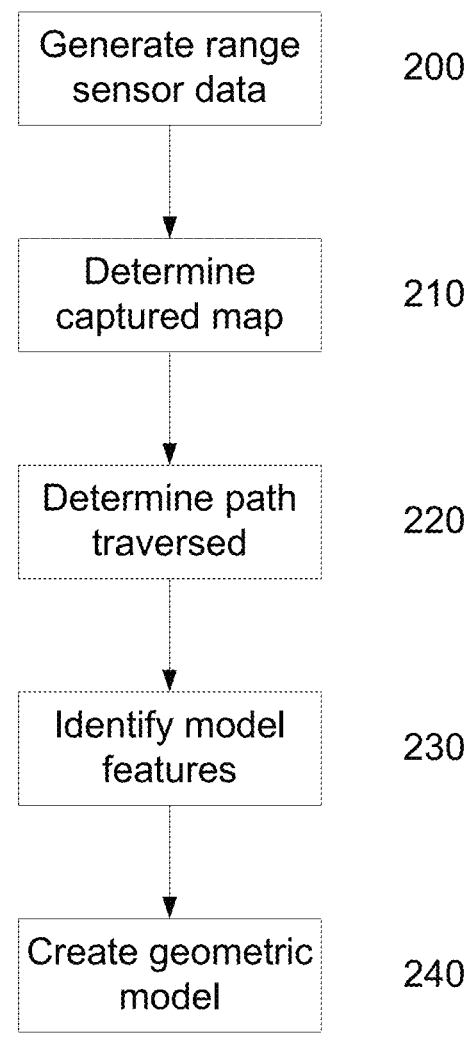
FIG. 2 is a flowchart of an example of a method of generating a three-dimensional geometric model of a structure.

Operation of the apparatus of FIG. 1 will now be described with reference to FIG. 2.

In use, the handheld sensing device is a carried by a user as the user moves through the structure that is to be mapped. At step 200, the sensing device 120 generates sensor data at least partially indicative of a position of the sensing device relative to at least part of the structure. For example, this would typically include at least range data, and optionally other data such as position and orientation data or the like.

At step 210, the at least one processing device 110 determines a captured map of at least part of the structure using the sensor data. The captured map can be of any appropriate form, but is typically a point cloud model of the structure. At step 220, the at least one processing device determines at least part of a path traversed by the sensing device 120, for example as the user moves through the structure. The path is typically in the form of a sequence of positions and orientations of the sensing device relative to the structure and this is typically determined from the sensor data. For example, this can be achieved as part of known SLAM processing techniques. It will also be appreciated that steps 210 and 220 can be performed in any order and/or simultaneously, and reference to separate steps is not intended to be limiting.

At step 230 the processing device identifies one or more model features using the part of the path and the captured map. In particular, the processing device utilises information regarding the path traversed by the sensing device, to assist in interpreting the captured map, in turn allowing the processing device to identify features within the captured map that correspond to features within or associated with the structure, including but not limited to structural features, such as walls, floors, or the like, and/or objects contained within the structure.

This takes into account that the path traversed by the sensing device 120 must be a navigable path, and hence consist of empty regions of a sufficient size to accommodate the sensing device 120 and whatever mechanism is used to move the sensing device, such as a user or the like. This, in turn, can be utilised to put constraints on interpretation of the captured map, ensuring for example that model features corresponding to walls, the floor and ceiling are situated remote to the path traversed by the sensing device and user.

By way of example, if the sensor is a handheld sensor carried at torso height, it can be assumed that the floor is below the sensor position and hence the path traversed by the sensing device. Accordingly, this can be used in interpreting the captured map, allowing model features to be identified by constraining analysis of the captured map based on the path of the sensing device through the structure. This in turn can significantly reduce computational requirements when interpreting captured maps, as well as increasing the accuracy of the conversion process, reducing the likelihood of erroneous feature identification.

At step 240, the identified model features can be used to create a three-dimensional geometric model of the structure. The three-dimensional geometric model can be of any appropriate form, but is typically in the form of a Computer-Aided Design (CAD) style model of the structure. This reduces the data required to define the model of the structure as compared to the captured point cloud model, making the model easier to manipulate and transfer, making this more usable.

Accordingly, it will be appreciated that the above described process takes into account the portable nature of the sensing device, in particular understanding that the path traversed by the sensing device places inherent limitations on the layout of the structure being mapped. This in turn is used to significantly reduce the computational requirements in converting point cloud models, whilst also increasing the accuracy of the resulting geometric models. Furthermore, this can optionally, although not essentially, take into account that data can be acquired continuously along the path.

A number of further features will now be described.

The model features can be determined in any one of a number of manners, but generally this is performed using a volume growing process. In this regard, volumes can be grown within the captured map in order to identify empty regions within the captured map, which can correspond to rooms or the like.

By growing volumes, this can easily identify boundaries within the structure, and in particular, identifies these in a more robust manner than typical techniques such as planar surface identification. In this regard, attempting to identify planar surfaces within a captured map suffers from a number of disadvantages. For example, this technique has difficulty identifying irregular boundaries, such as those covered by furnishings, such as curtains, or surfaces obscured by objects. Additionally, such techniques often fail to identify open boundaries, such as doorways, or windows, which may not be sensed, depending on the sensing technique used.

In contrast, volume growing techniques can more easily take into account additional parts of the captured map, for example by growing volumes through objects until a partially obscured boundary is identified, and also using parts of the model adjacent open boundaries, such as the wall on either side of a doorway, making the identification of boundaries, more reliable.

Additionally, when using surface identification, this can often result in surfaces that do not intersect, leading to unresolved or incomplete portions in the resulting model. In contrast, volume growing can be used to identify physically valid spaces, which can be more easily linked, for example with adjacent rooms, or combined, in the case of irregular rooms. This can in turn allow a complete "air-tight" geometric model to be created. This is important in many applications, such as mapping of air flows, or the like.

The volume growing process can be performed in any suitable manner. In one example, the at least one electronic processing device performs the volume growing process by generating a number of seed volumes, for example in the form of polyhedrons, and for rooms, more typically cuboids, which are then grown and/or combined or merged, to determine empty volumes within the captured map. This process is performed by progressively growing the volumes until a boundary or surface is encountered, so that the empty volumes can be used at least in part to identify the model features, such as the rooms or spaces within the structure.

In one example, seed volumes are defined relative to, and in particular, along the path traversed by the sensing device. Thus, using knowledge that the path traversed by the sensing device must be inherently empty, this allows seed volumes to be positioned along the path, providing a starting point for growing empty volumes, which can be used to identify the boundaries of empty regions within the structure.

The processing device typically defines at least one of a position, orientation, size, shape and number of seed volumes, typically relative to the path. This allows the size, shape, location, orientation, number and/or extent of the seed volumes to be optimised based on knowledge of the arrangement of the structure and/or use of the sensing device. Thus, for example, understanding that the sensing device is handheld or otherwise portable constrains the possible proximity of the sensing device relative to surfaces, such as floors, walls and ceilings of the structure, allowing the seed volumes to be defined accordingly. This maximises the likelihood that structure surfaces and/or other boundaries will be correctly identified and minimises the amount of processing required for this to be achieved.

Typically the volume growing is performed at least in part using a ray cloud model of at least part of the structure. In this regard, the captured map is typically a point cloud model, in which case the electronic processing device uses the captured map and at least part of the sensing device path to create the ray cloud model. Thus, sensor data is used to determine captured points in the structure to thereby generate a point cloud model and a position and orientation of the sensing device relative to the structure to determine the path relative to the point cloud model. Using this information, the processing device creates the ray cloud model based on the position of points in the point cloud and the position and orientation of the sensing device on the path when the respective point in the point cloud was captured. Thus, the processing device effectively traces a ray extending from the sensing device to sensed points in the point cloud, and assumes that this space is empty. This allows seed volumes to be progressively grown within the cloud of rays until a boundary is reached. However, it will be appreciated that other suitable techniques could be used.

The processing device can also create, grow or combine one or more seed volumes based additional information, such as a defined point of interest, analysis of at least part of the path and/or user defined annotations. This allows the seed volume to be configured to maximise the effectiveness of the volume growing process. So for example, a different seed volume shape, size, location, orientation, or number of seeds volumes could be used for a corridor compared to an office. Similarly, knowledge that a table is present in a room can be used to avoid the table surface being defined as the floor of the room, as may occur if a seed volume is grown above the table surface in the model.

The point of interest, shape of the path and/or annotation could be indicative of an extent, such as the size, shape or position and orientation, of a structural feature or object, and/or information regarding a type or nature of a structural feature or object. This process can be used so that the creation and development of seed volumes can be performed not only on the basis of the path location, but also based on additional knowledge regarding properties of structural features or object.

Points of interest can be determined using either analysis of at least part of the path and/or user defined model annotations. Thus, for example, the processing device could analyse aspects of the path, and use this to determine certain attributes of the structure. For example, if part of the path defines a closed loop that is smaller than a given size, this could be indicative of a perimeter of a room, which can in turn allow a seed volume to be created within the confines of the closed loop. Similarly, changes in height of the sensor relative to the structure could be indicative of the presence of stairs or a ramp, again allowing seed creation to be modified.

More typically however, the points of interest are at least in part manually defined through the creation of user defined annotations based on visual inspect of the structure as the sensor data is collected. In this instance, the system can include an input 130 associated with the portable sensing device 120, which allows a user to define annotations indicative of points of interest as the user travels through the structure. This allows the system to generate annotation data indicative of a point of interest identifier and point of interest location, which can then be used during analysis of the captured map.

Thus, whilst capturing the sensor data using the sensing device, the user could visually identify specific structural features, such as the extent and types of different spaces within the structure, so as to distinguish between rooms, corridors, stairways, or the like, as well as to identify features, such as doorways, and the presence of particular objects, such as furniture or the like. This allows the user to provide input that can assist in interpreting the resulting captured map, which can significantly reduce computational requirements and increase accuracy.

The nature of the input, and hence the annotation data, can vary depending on the preferred implementation. For example, this could include allowing the user to enter input commands via a user interface presented on a touch screen or the like, with the commands being used to select a particular feature from a list of available features. The user could perform a predetermined gesture using the sensing device, such as hovering, shaking or rotating the sensing device, allowing this to be identified when the sensor data is analysed, for example using an inertial sensor, or by extracting position or orientation information from analysis of range data.

However, more typically this is achieved using a microphone that generates audio data indicative of utterances of the user, and wherein the at least one electronic processing device uses the utterances to determine annotation data. Thus, for example the one or more processing devices can use speech recognition to determine a point of interest identifier, such as a meaning associated with the utterance, whilst also using the position of the sensing device when the audio data is captured to determine a point of interest location. It will be appreciated that this provides a mechanism for allowing the user to seamlessly create annotations within the point cloud, without requiring the user to otherwise physically interact with the system, ensuring that the user can continue to operate the sensing device for sensor data capture without interference.

In one example, the annotation data can be used for the purpose of creating, growing and combining seed volumes. For example, the one or more processing devices can use the annotation data of one or more annotations to determine an extent of a point of interest. This allows multiple annotations to be associated with a common identifier when these are referring to a common feature, so that the size and/or shape of the feature can be easily identified. Thus, annotations could be defined in corners of a room allowing the size of the room to be easily determined, which in turn can be used in controlling the size of a seed for the room. Thus, it will be appreciated that the annotations are associated with the 3D structure based on the location of the sensing device when the annotations are captured.

Additionally the annotations can be used to assist in identifying the nature of specific features. For example, a corridor and stairway would have different characteristics, and hence would typically require different configurations of seed volume. Accordingly, by labelling such regions within the structure, this allows specific configurations of seed volumes to be used.

Additionally, this can be used to identify specific items or objects within a captured map, such as furniture, fixtures or fittings, allowing parts of the captured map to be assigned to these objects. Additionally, this can allow the relevant parts of the captured map to be substituted for model components, representing the objects, thereby optimising the resulting geometric model.

In this regard, the processing device can determine a model component using the point of interest data and then incorporate the model component into the geometric model of the structure as a model feature. Specifically, this process would typically involve using a point of interest identifier to select a number of model components, compare the model components to the captured map and substitute at least part of the captured map for one of the model components. So for example, if the annotation identifies an object as a table, the processing system can determine model components, such as CAD models of tables, compare these to the captured map and replace part of the captured map with a table model component.

The model features are typically indicative of structural features and/or objects within the structure. In this regard, the nature of the structural features will depend on the structure being modelled, but will typically include structure boundaries, surfaces or volumes, so for example, when the structure is the internal structure of a building, the structural features would typically include, but not be limited to walls, floors, ceilings, partitions or dividers, doors and doorways, walkways, stairs and stairwells, corridors, rooms, or the like. Similarly objects can include any object within the structure, including, but not limited to furniture, fixtures, fittings, or the like.

In this regard, using information regarding the path traversed by the sensor can assist in interpreting the captured map by distinguishing between different structural features. For example, it will be appreciated that the path traversed by the sensing device would be unable to pass through a wall, so this can assist in constraining wall formation within the model, and allow doorways to be identified. Similarly, the sensing device would typically be carried at a relatively fixed height, allowing this to be used in constraining the location in which floors, and similarly ceilings, are identified within the captured map. This also helps to distinguish between object and structural features, by constraining the analysis of the captured map so that structural features can be identified whilst objects are ignored, as will be described in more detail below.

Having identified at least some structural features, the electronic processing device can removes at least part of the captured map corresponding to these structural features from the captured map and then identify objects from remaining parts of the captured map. This significantly reduces the computational requirement in identifying objects within the captured map and assists in making object identification more robust.

Additionally, having determined at least part of the captured map corresponding to an object, the processing device can then determine a user defined annotation associated with the part of the captured map corresponding to the object, and then use the annotation to identify the object. Thus, this can be used to constrain interpretation of the part of the captured map that corresponds to the object, for example by allowing model components corresponding to the object to be compared to the captured map, allowing a matching object to be more easily identified.

In one example, the processing device can determine an orientation of a gravity vector with respect to the captured map using at least one structural feature and then identify objects at least in part using the gravity vector. For example, this can involve analysing the captured map to identify a floor, and then using this to locate and identify objects. In this regard, some objects, such as tables and chairs, would typically be positioned on the floor, allowing this information to be used to constrain the identification of the objects. Additionally, many objects will typically have a known orientation relative to the gravity vector, so that for example, televisions would typically be orientated largely parallel to the gravity vector and hence perpendicular to the floor. Accordingly, knowledge of the gravity vector orientation provides contextual information that can assist in identifying objects.

In the above described arrangement, the sensor data is typically indicative of one or more of a range of at least part of the structure from the sensing device, an orientation of the sensing device and/or a position of the sensing device. This can be captured using any suitable sensing arrangement, including but not limited to a laser range finder, an optical imaging device, such as a camera, and/or an inertial sensor. It will be appreciated form this, that as previously described, any suitable arrangement could be used.

Figure 3A:
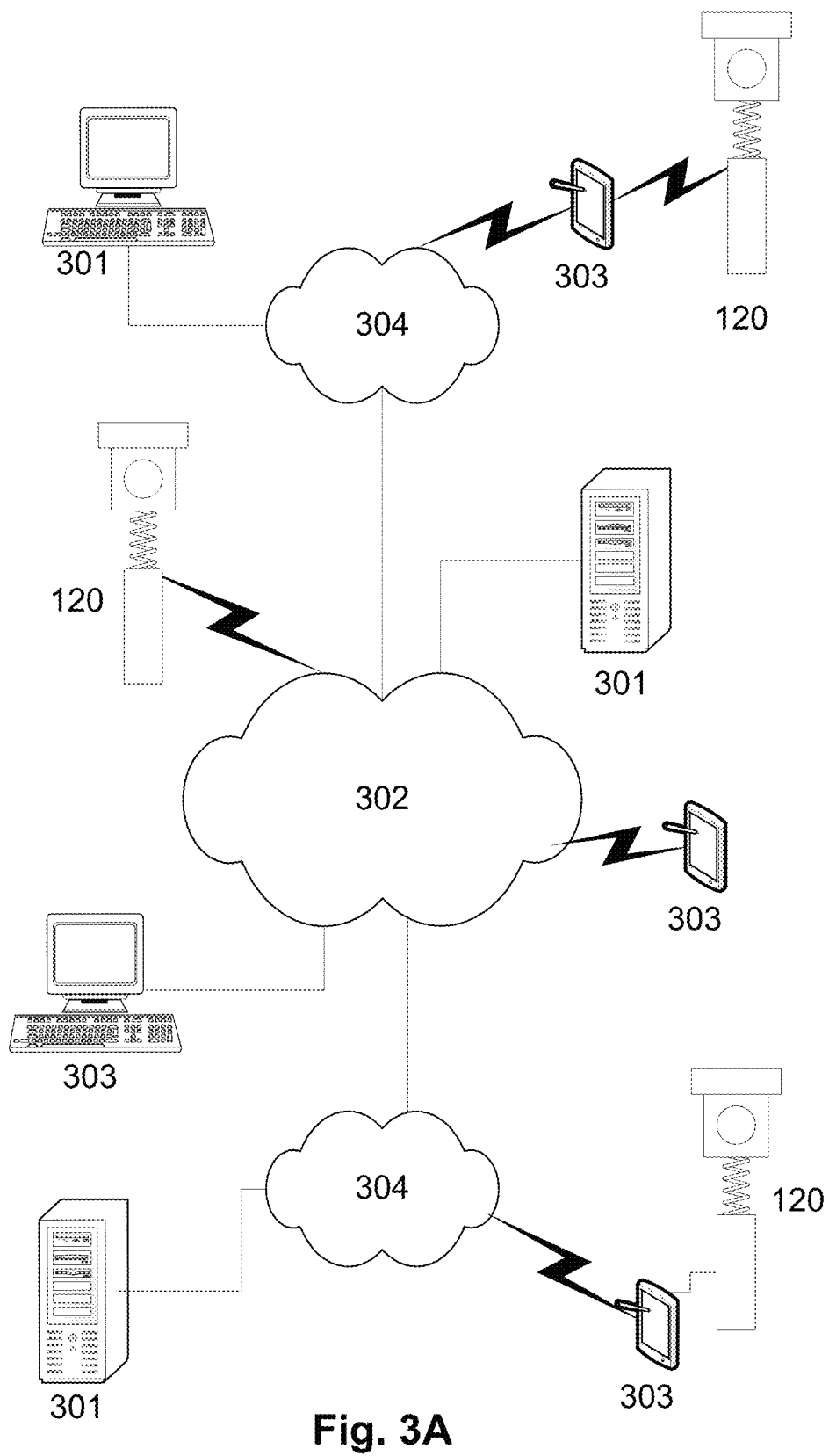
FIG. 3A is a schematic diagram of a distributed computer architecture for use in generating a three-dimensional geometric model of a structure.
Figure 3B:
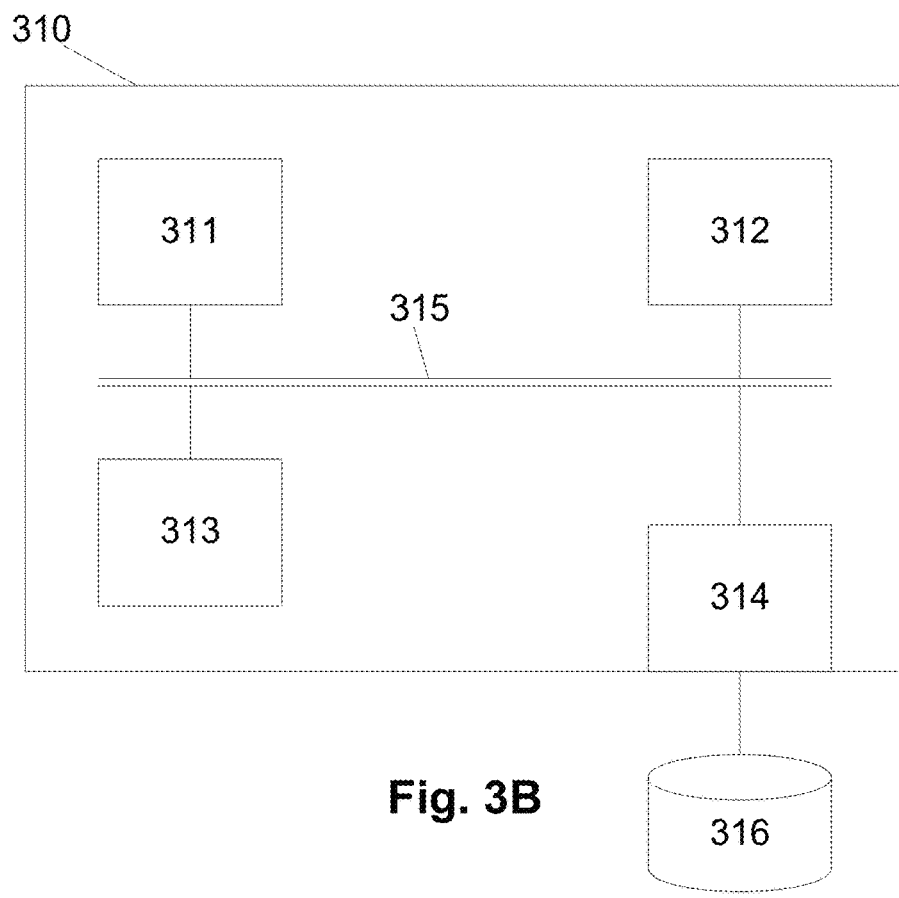
FIG. 3B is a schematic diagram of an example of a base station processing system of FIG. 2.

As mentioned above, in one example, the process is performed by one or more processing systems operating as part of a distributed architecture, an example of which will now be described with reference to FIGS. 3A to 3C.

In this example, a number of base stations 301 are coupled via communications networks, such as the Internet 302, and/or a number of local area networks (LANs) 304, to a number of client devices 303. It will be appreciated that the configuration of the networks 302, 304 are for the purpose of example only, and in practice the base stations 301 and client devices 303 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In one example, each base station 301 includes one or more processing systems and whilst the base station 301 is a shown as a single entity, it will be appreciated that the base station 301 can be distributed over a number of geographically separate locations, for example by using processing systems that are provided as part of a cloud based environment. However, the above described arrangement is not essential and other suitable configurations could be used.

An example of a processing system 310 of suitable base station is shown in FIG. 3. In this example, the processing system 310 includes at least one microprocessor 311, a memory 312, an optional input/output device 313, such as a keyboard and/or display, and an external interface 314, interconnected via a bus 315 as shown. In this example the external interface 314 can be utilised for connecting the processing system 310 to peripheral devices, such as the communications networks 302, 304, databases 316, other storage devices, or the like. Although a single external interface 314 is shown, this is for the purpose of example only, and in practice multiple interfaces using various methods (eg. Ethernet, serial, USB, wireless or the like) may be provided.

In use, the microprocessor 311 executes instructions in the form of applications software stored in the memory 312 to allow the required processes to be performed. The applications software may include one or more software modules, and may be executed in a suitable execution environment, such as an operating system environment, or the like.

Accordingly, it will be appreciated that the processing system 310 may be formed from any suitable processing system, such as a suitably programmed client device, PC, web server, network server, or the like. In one particular example, the processing system 310 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 3C:
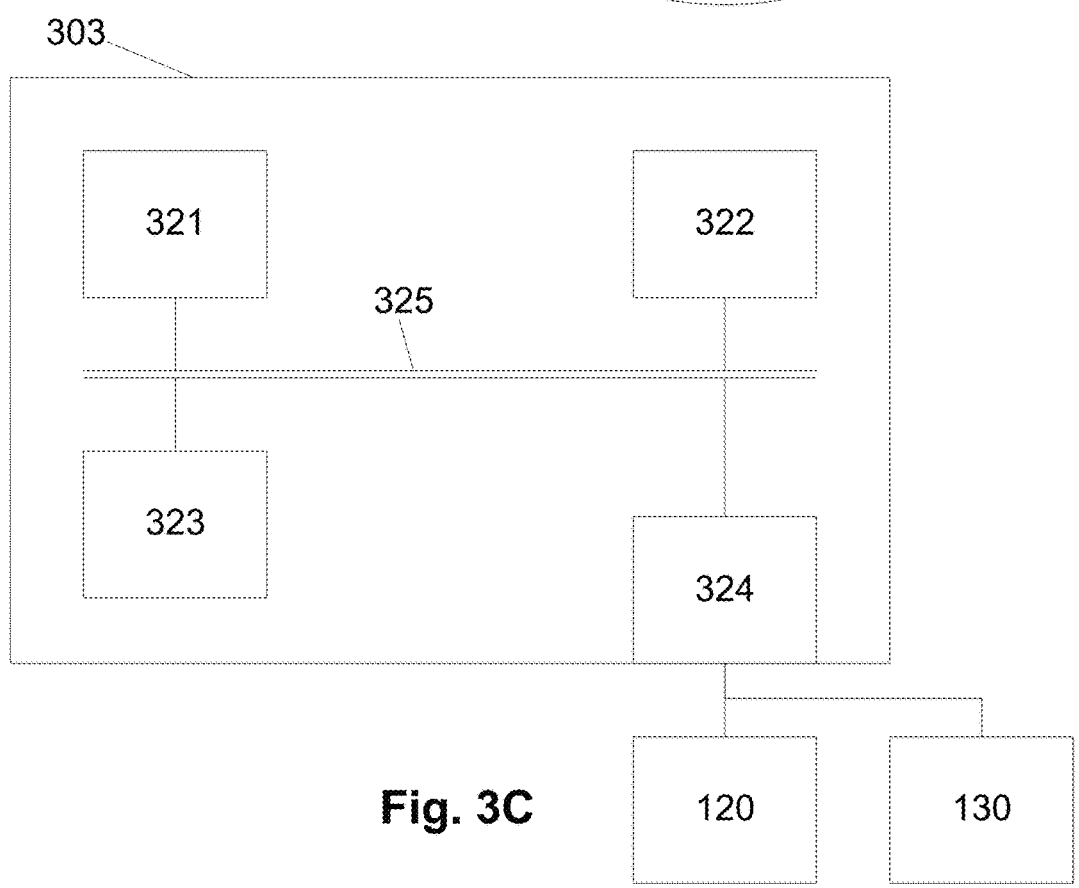
FIG. 3C is a schematic diagram of an example of a client device of FIG. 2.

As shown in FIG. 3C, in one example, the client device 303 includes at least one microprocessor 321, a memory 322, an input/output device 323, such as a keyboard and/or display, and an external interface 324, interconnected via a bus 325 as shown. In this example the external interface 324 can be utilised for connecting the client device to peripheral devices, such as the communications networks 302, 304, databases, other storage devices, or the like. Although a single external interface 324 is shown, this is for the purpose of example only, and in practice multiple interfaces using various methods (eg. Ethernet, serial, USB, wireless or the like) may be provided.

In use, the microprocessor 321 executes instructions in the form of applications software stored in the memory 322 to allow communication with the base station 301. Accordingly, it will be appreciated that the client devices 303 may be formed from any suitable processing system, such as a suitably programmed PC, Internet terminal, lap-top, or hand-held PC, and in one preferred example is either a tablet, or smart phone, or the like. Thus, in one example, the processing system 303 is a standard processing system such as an Intel Architecture based processing system, which executes software applications stored on non-volatile (e.g., hard disk) storage, although this is not essential. However, it will also be understood that the client devices 303 can be any electronic processing device such as a microprocessor, microchip processor, logic gate configuration, firmware optionally associated with implementing logic such as an FPGA (Field Programmable Gate Array), or any other electronic device, system or arrangement.

In use, processing of data from the sensing device could be performed by any one or more of the client device 303 and base stations 301. In one example, the processing system 100 is therefore part of the client device 303 and/or base station 301, but alternatively could be part of the sensing device 120, and in communication with the client device 303 and/or base station 301 as required.

Examples of the processes for generating a geometric model will now be described in further detail. For the purpose of these examples it is assumed that processing system 100 corresponds to a client device 303 which is carried by a user, such as a mobile phone or the like, and which is in communication with a base station 301, allowing processing to be performed remotely thereon.

For the purpose of illustration, it will be assumed that the user interacts with the client device 303 and processing systems 310 via a GUI (Graphical User Interface), or the like presented on the client device 303. Actions performed by the client device 303 are performed by the processor 321 in accordance with instructions stored as applications software in the memory 322 and/or input commands received from a user via the I/O device 323, whilst actions performed by the processing systems 310 are performed by the processor 311 in accordance with instructions stored as applications software in the memory 312.

However, it will be appreciated that the above described configuration assumed for the purpose of the following examples is not essential, and numerous other configurations may be used. It will also be appreciated that the partitioning of functionality between the client devices 303, and the base station 301 may vary, depending on the particular implementation.

Figure 4:
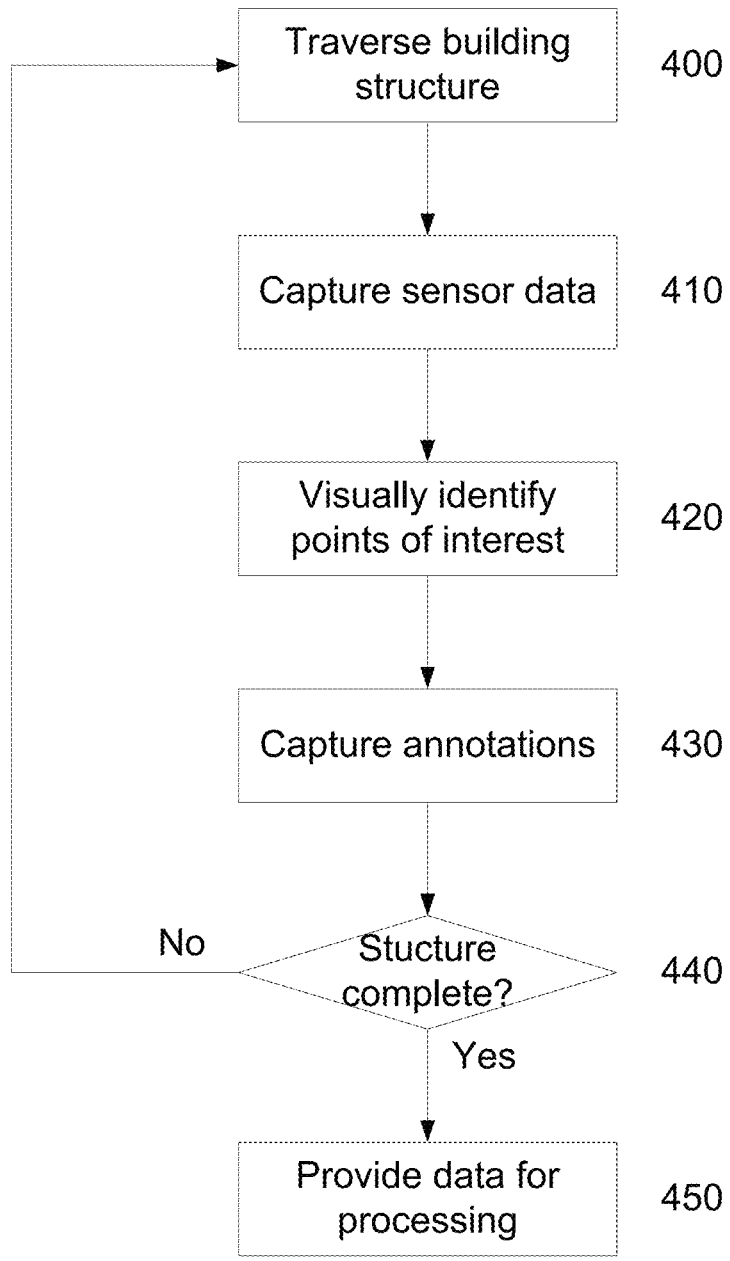
FIG. 4 is a flowchart of a specific example of the process of data collection for use in generating a three-dimensional geometric model of a structure.

An example process for capturing data used in creating a geometric model of a building interior will now be described in more detail with reference to FIG. 4.

In this example, at step 400 a building structure is traversed by having the user move through the building structure for example following corridor and stairwells and navigating into and, where possible, around a perimeter of rooms. During this process, the user carries a sensing device, such as the Zebedee 3D mapping system described above, together with a data acquisition system, such as a client device 303. In one example, the client device 303 includes a mobile phone, as this can be easily carried by the user, although this is not essential and additional or alternative equipment could be used, such as a laptop or other suitable device.

During this process, sensor data are captured at step 410 and stored by the acquisition system. In the case of the Zebedee system, this will typically include at least range data and inertial data. Thus, it will be appreciated that the user moves around within the building, allowing the interior surfaces to be imaged by the LiDAR system, so that range data can be captured, together with inertial data indicative of movement of the LiDAR system. However, it will also be appreciated that for other sensing device arrangements, different data could be collected, so that for example stereoscopic image data could be collected, with this being analysed using photogrammetry techniques.

During this process, preliminary analysis of the captured data could be performed to alert the user to errors in data capture, allowing the user to re-image parts of the structure as required.

At step 420, as this is performed, the user will visually identify points of interest of interest, such as rooms, doorways, surfaces, objects or the like. At step 430, the user can create an annotation utilising the input 130. This can be achieved in any one of a number of ways, but typically involves using an input in the form of a microphone 130 to capture user utterances referring to a specific point of interest. The user typically speaks when they are in the vicinity of a relevant point of interest, allowing the location of the point of interest to be determined. Thus, for example, the user can say "doorway" as they pass through a doorway, allowing the location of the doorway to be identified. Similarly, when near an object, the user can create an annotation, for example saying "chair", when position the sensing device near a chair. Alternatively other forms of annotation input could be used, such as a graphical user interface, predetermined sequence or patterns of sensing device movements, or the like.

In general the annotation should be unique to given point of interest, although multiple annotations could be defined for a common point of interest. For example, the user could repeatedly say "corridor one" as they traverse a first corridor, creating annotations at different locations along the corridor and/or at extremities of the corridor.

Given that buildings can be noisy environments, a physical trigger can optionally be used to activate the microphone when an annotation is to be captured, although this is not essential or other techniques to ensure capturing of the utterances could be used, such as using localised microphone. In one example, the microphone forms part of the mobile phone or other client device 303, although this is not essential.

At step 440 it is determined if the process is complete and if not this continues until the entire structure of or at least portion of the structure of interest has been traversed and appropriate sensor data captured together with associated corresponding annotations. The data is then provided for processing at step 450, for example by uploading this to a server, such as a base station 301.

Figure 5A:
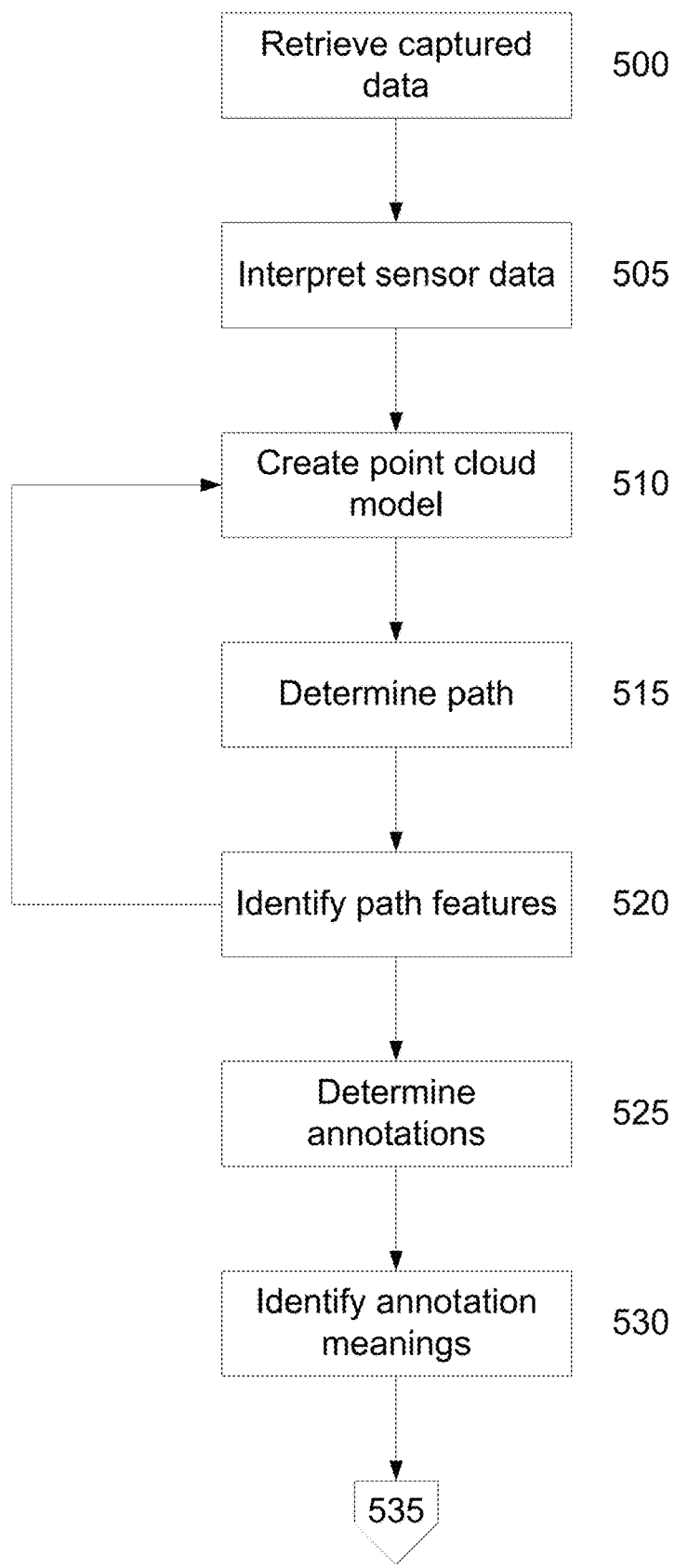
FIGS. 5A to 5C are a flowchart of an example of a method processing captured data for generating three-dimensional geometric model of a structure.
Figure 5B:
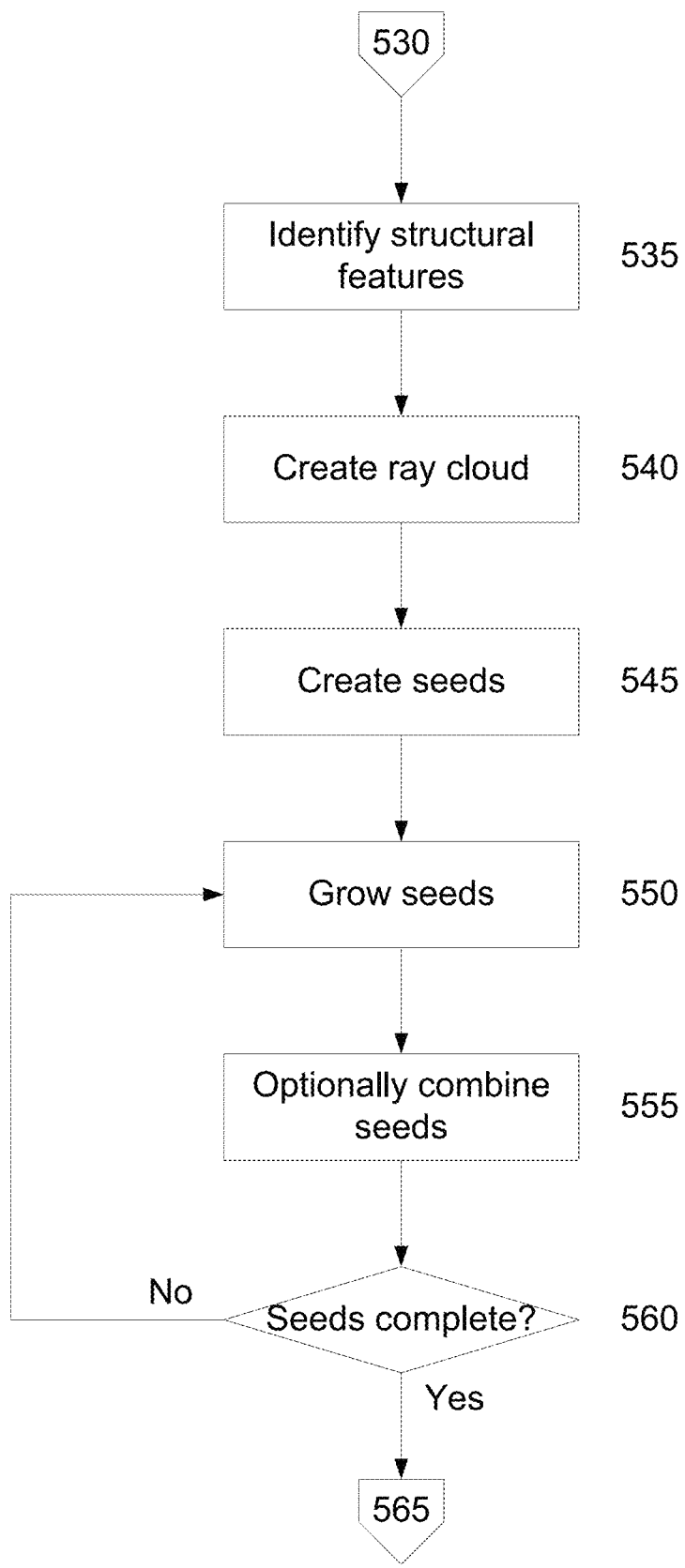
Figure 5C:
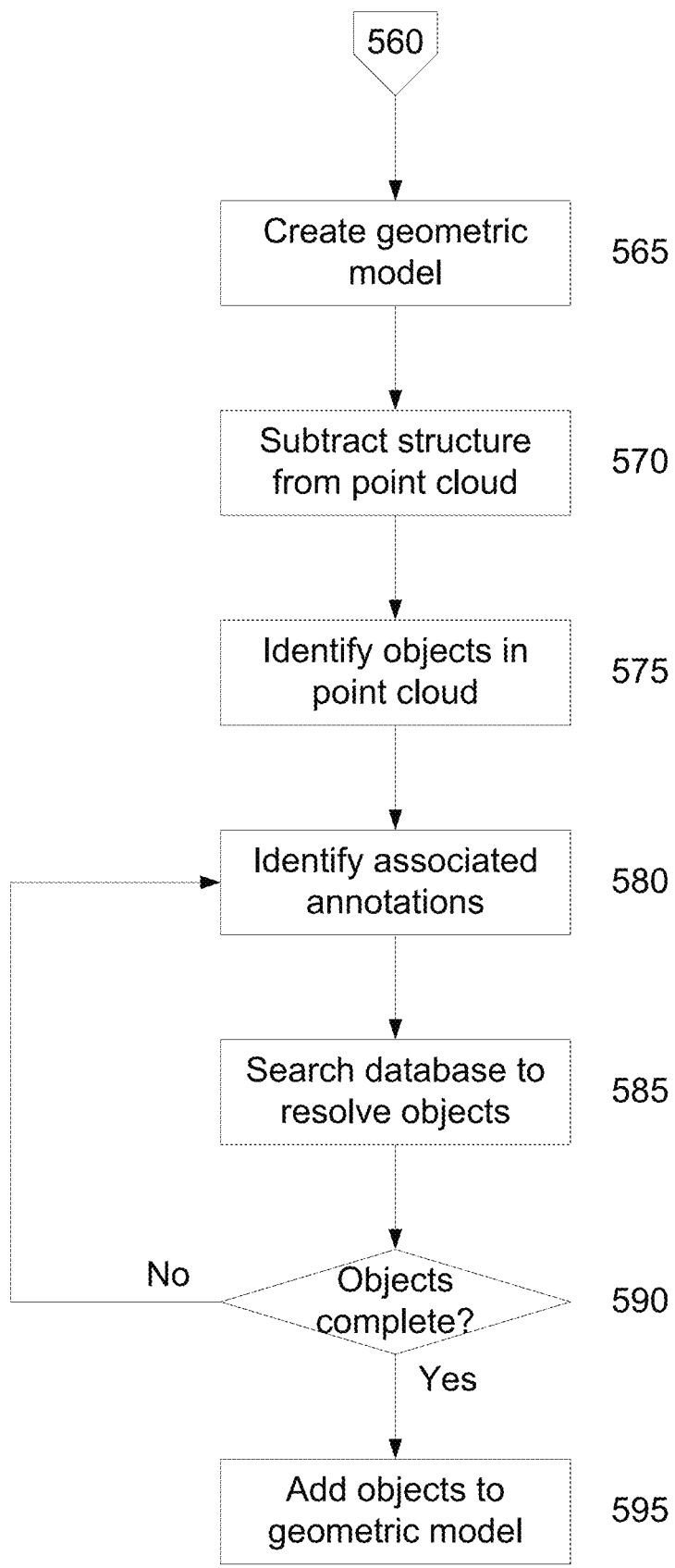

An example of processing of captured data will now be described with reference to FIGS. 5A to 5C.

In this example at step 500 captured sensor data is retrieved, for example, by the processing system 310 of the base station 301. For the purpose of clarity, it will be assumed that the remaining steps are performed by the processing system 310, largely automatically, albeit with manual intervention as required, unless otherwise stated.

Figure 6A:
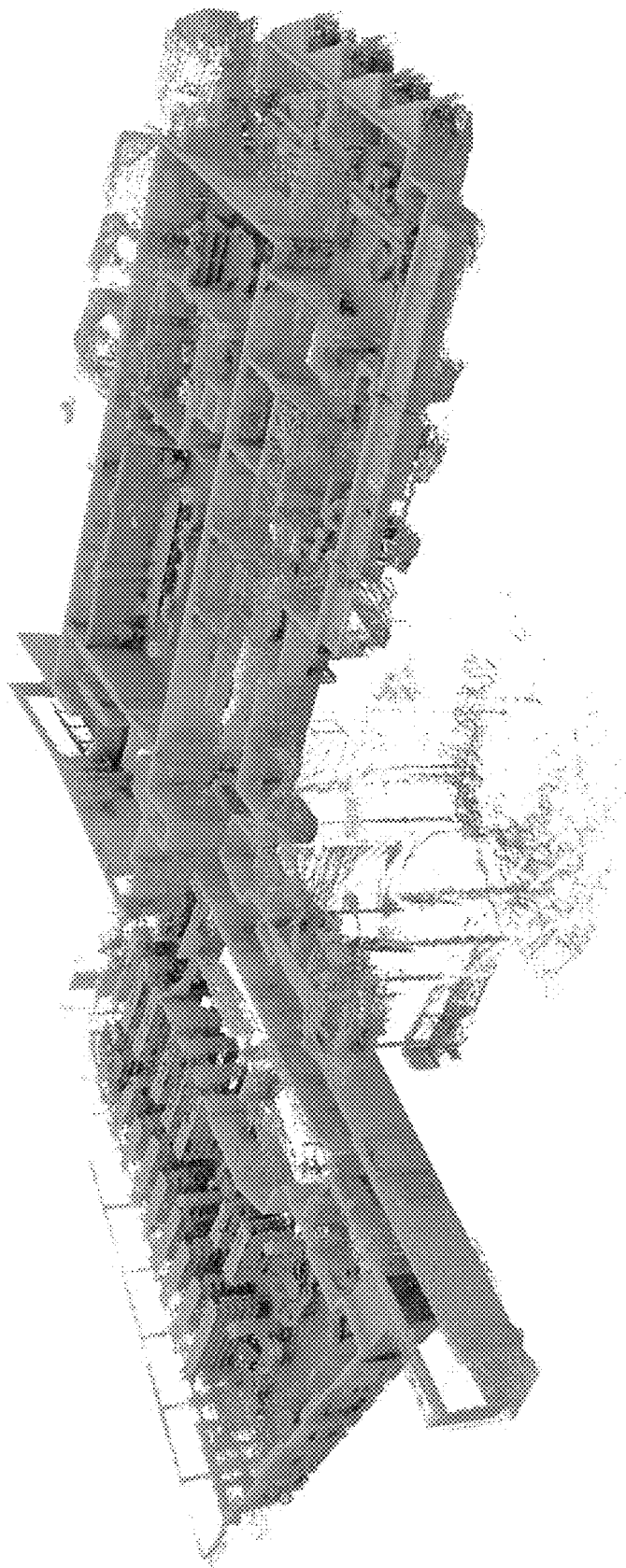
FIG. 6A is a schematic perspective diagram of an example of a cloud model.

At step 505, the sensor data is interpreted, to create a point cloud model at step 510, for example by determining the range of surfaces from the sensing device using range data, using photogrammetry of stereoscopic images, or the like. An example point cloud is shown in FIG. 6A, and it will be appreciated that the creation of point cloud models is known in the art and will not therefore be described in any detail.

Figure 6B:
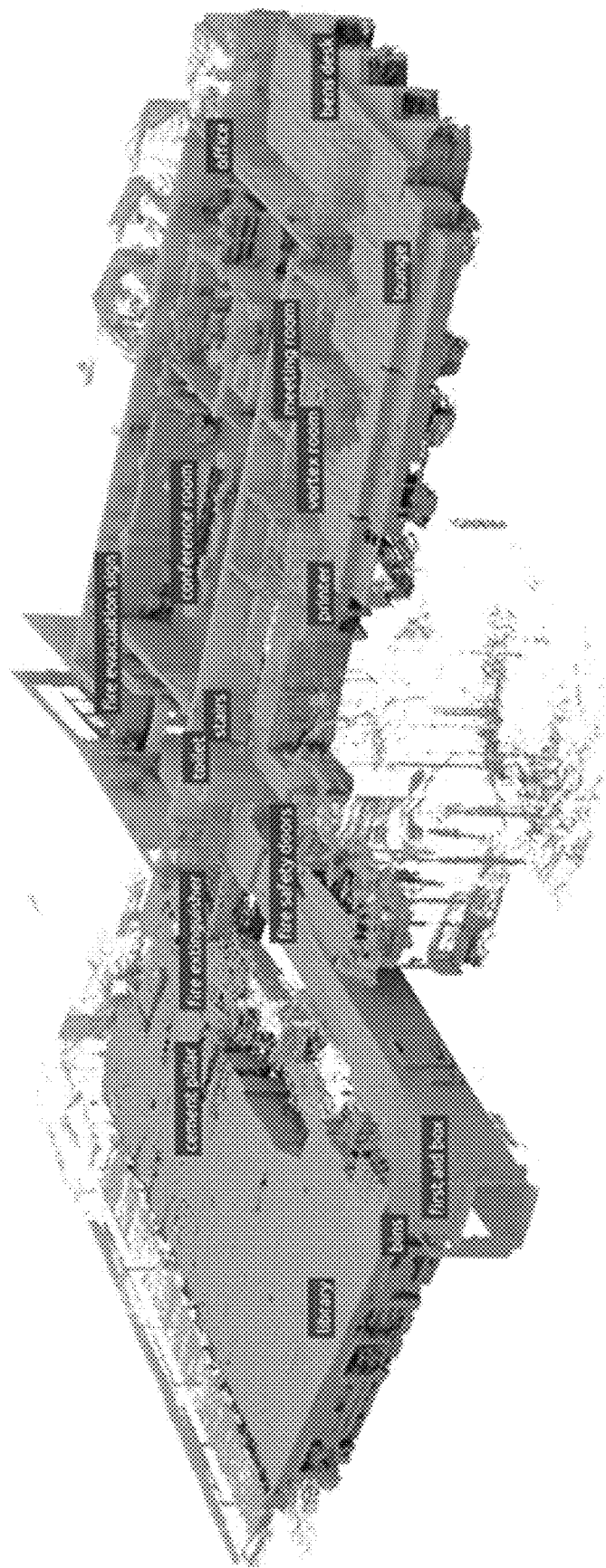
FIG. 6B is a schematic perspective diagram of an example of a point cloud model including text.
Figure 6C:
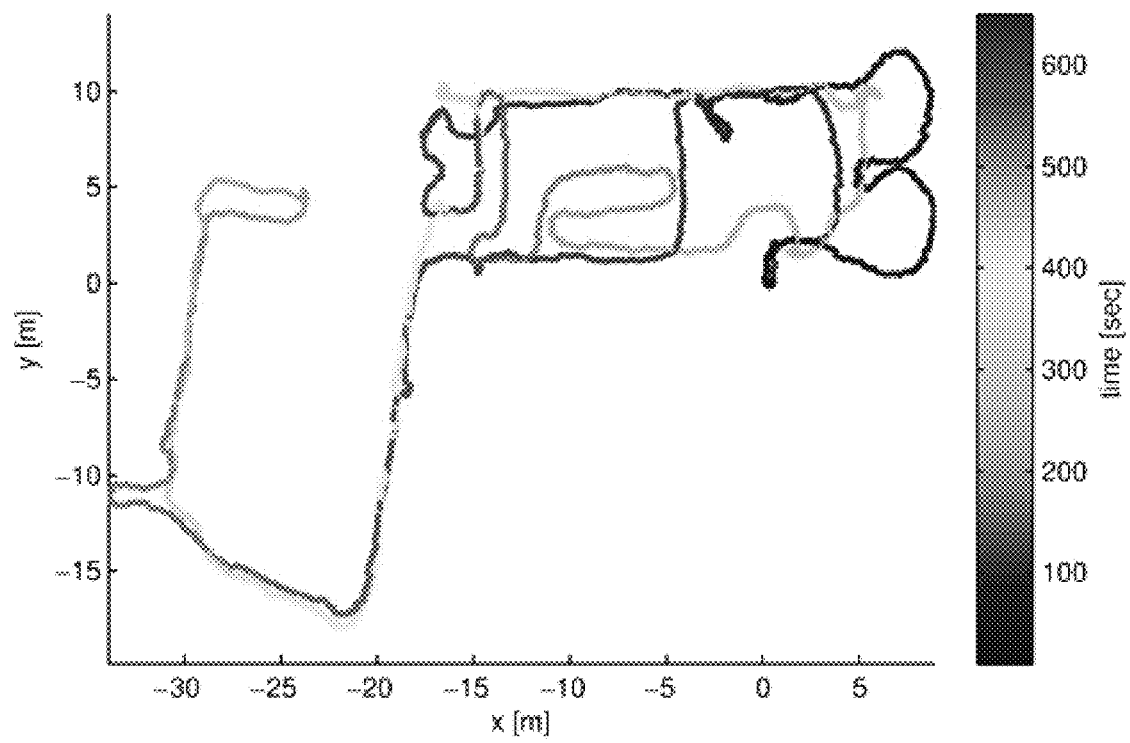
FIG. 6C is a schematic diagram of an example of a plan view of a path.
Figure 6D:
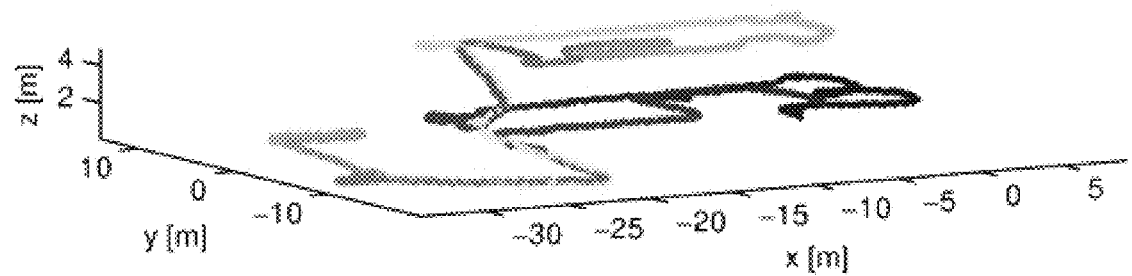
FIG. 6D is a schematic diagram of a perspective view of an example of a path through a structure.

At step 515 a path through the structure is determined utilising the sensor data and example paths are shown in FIGS. 6C and 6D. As part of this process, the path can be analysed to identify path features, such as closed loops, at step 520. As will be appreciated by persons skilled in the art, the path features can be used as part of the process of creating the point cloud at step 510 and accordingly, this process can be performed iteratively as the captured data is analysed, and the point cloud model being updated as the particular path of features are identified. Thus, this will typically involve existing SLAM techniques.

At step 525, annotations are determined from the captured data, with these being analysed to identify associated meanings, at step 530. This can involve performing voice recognition techniques, to identify the words spoken by the user, followed by a semantic analysis in order to interpret the meaning of the words, which is used in interpreting the annotations. The annotations are typically created when the user adds at a particular location and accordingly, these are assigned to specific locations within the point cloud as shown for example at FIG. 6B.

At step 535, annotations corresponding to structural features are identified based on the semantic meaning. Thus, this is used to distinguish between annotations corresponding to objects within the structure and those relating to the structure per se, allowing structural features to be analysed independently of objects. When identifying structural features, this will examine the annotations to identify words associated with structural meanings, as well as examining multiple annotations that refer to common features, so for example a user may use the annotation "conference room" when standing in opposite corners of a conference room, thereby allowing the conference room structure to be identified based on the annotations. It will be appreciated that predefined terms can be used to refer to specific structure features or objects, to make annotations consistent.

At step 540 a ray cloud is created utilising the sensor data. In this regard, a ray cloud corresponds to the path travelled by radiation from the range sensing device, in this case the laser beam from the LiDAR, to the structure surface. Accordingly, the ray cloud is created by identifying, for each point in the point cloud, the location of the sensing device when the point was sensed, with a ray being traced between the sensing device and the point in the point cloud. This will be described in more detail below.

Figure 7A:
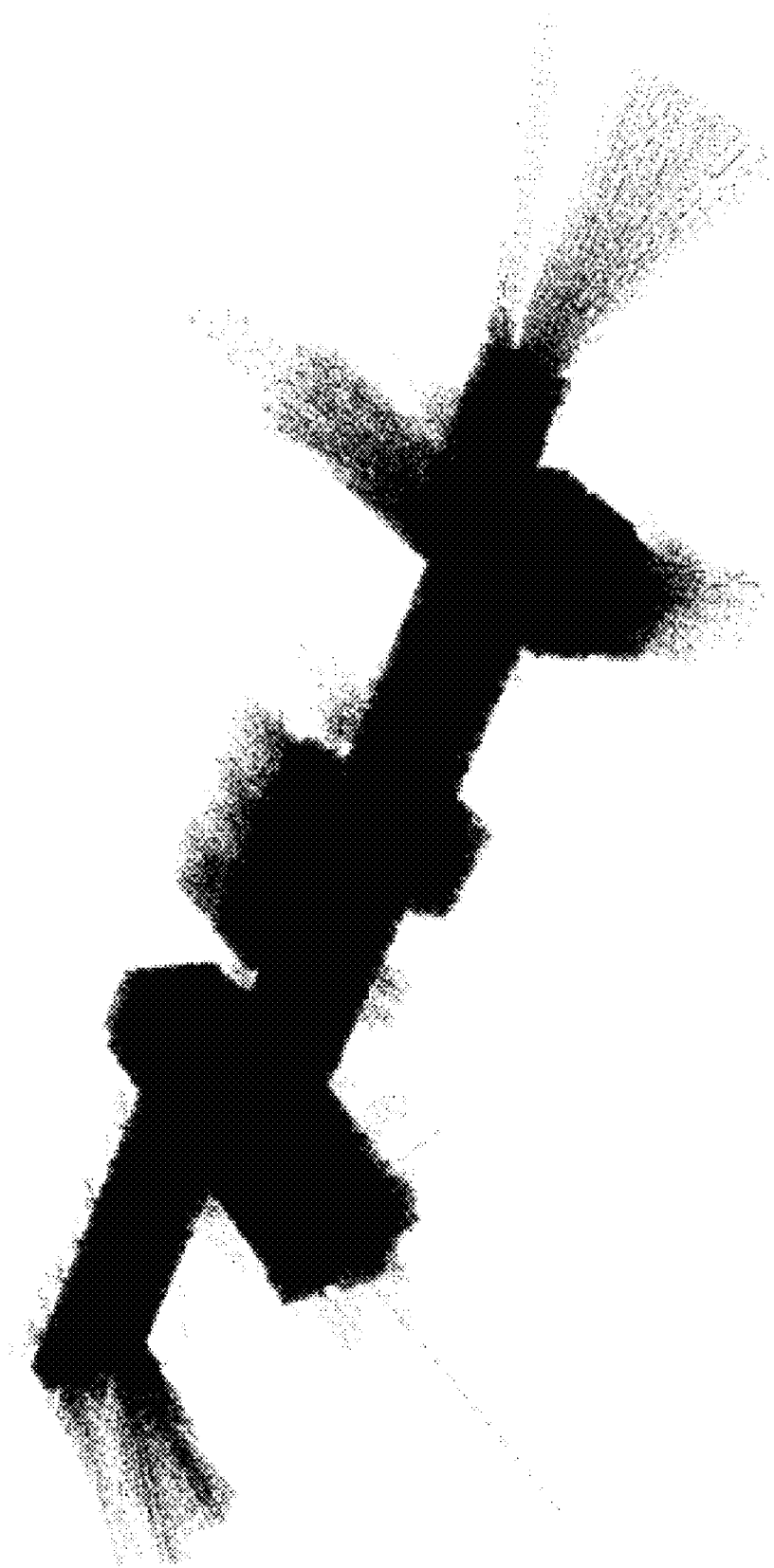
FIG. 7A is a schematic diagram of an example of a ray cloud of a structure.
Figure 7B:
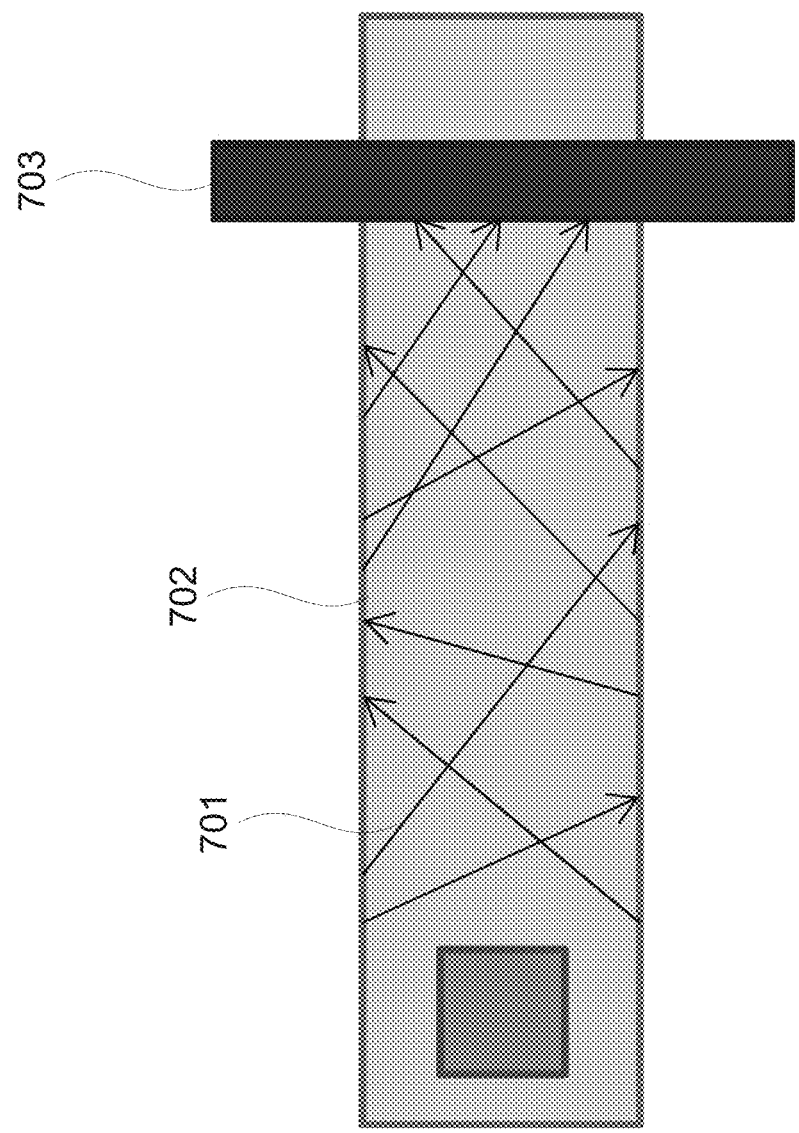
FIG. 7B is a schematic view of an example of rays within a building structure.

A complete ray cloud for a corridor is shown in FIG. 7A, with an example of rays 701 within a corridor 702, and how these terminate at a barrier 703, being shown in FIG. 7B. From this it is apparent that the location of rays in a ray cloud can be used to identify empty volumes within the structure, which in turn assist in identifying features such as walls, floors, ceilings or the like.

At 545 seeds volumes are created typically utilising the path structure features, or alternatively using empty regions determined from the ray cloud. The seed volumes are typically cuboids created coincident with the path, with the seed volumes having a defined size, position and orientation relative to the path, depending for example on features of the path and/or defined points of interest. Thus, defined size takes into account that at least a certain volume of space around the path travelled by the sensing device 120 must be free of obstructions. This includes, for example, assumptions on a height of the sensing device above the floor, distance below ceiling and, typically distance away from the wall. Thus it can be assumed for example that the trajectory followed by the sensing device is at least 15 cm from a wall, at least 80 cm above the floor and at least 80 cm below a ceiling, although any suitable values could be used, and such values could be defined by an operator in settings or the like. For example, different values may be used if the sensing device is mounted on a cart, trolley or the like.

Figure 8:
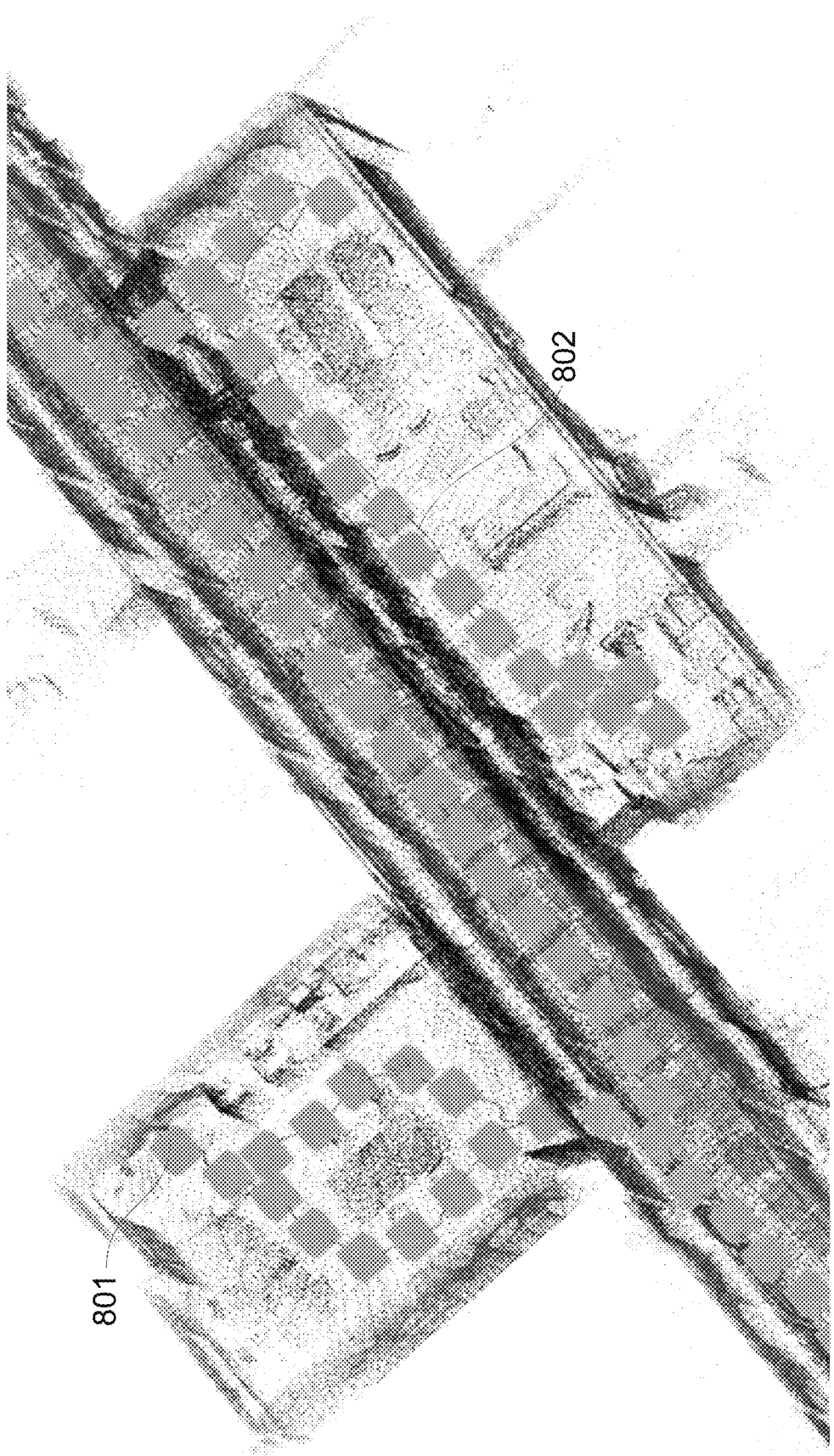
FIG. 8 is a schematic diagram of an example of seed volumes within a model of a building structure.

Additionally, the seed volumes can be defined based at least partially on annotations and/or the path trajectory. For example, if a closed loop is defined with the operator indicating though annotations that the loop is within a room, then a single seed volume could be established encompassing the entire loop. An example of seed volumes 801 as overlaid on a path 802 is shown in FIG. 8.

At step 550, the seed volumes are grown and optionally combined at step 555, using the ray cloud. Specifically, the seed volumes are extended within the ray cloud until the rays terminate. In the event that seed volumes impinge upon each other, these can be selectively merged.

Figure 9A:
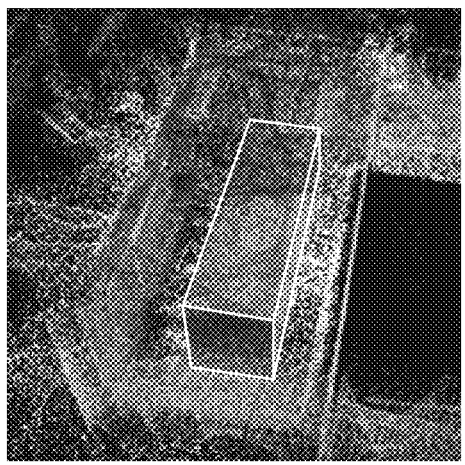
FIGS. 9A to 9H are schematic diagrams showing an example of a sequence of steps of growing seed volumes.
Figure 9B:
Figure 9C:
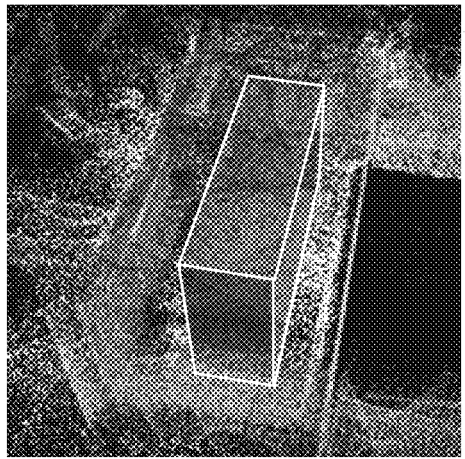
Figure 9D:
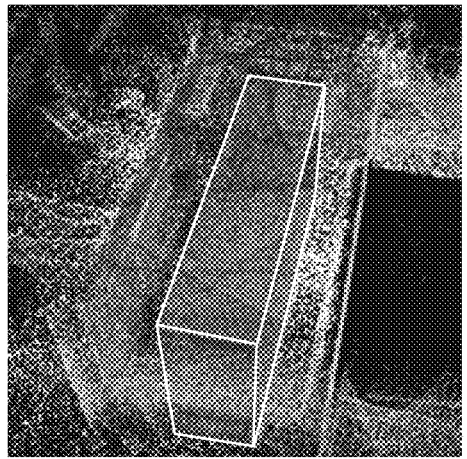
Figure 9E:
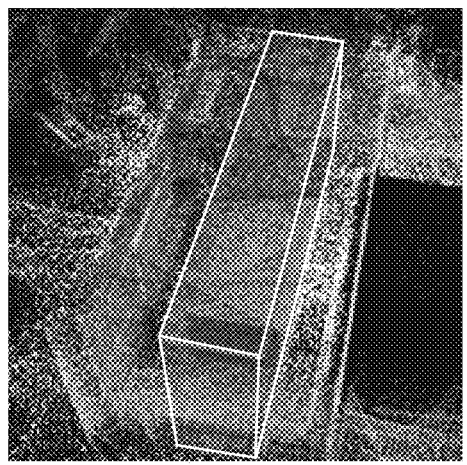
Figure 9F:
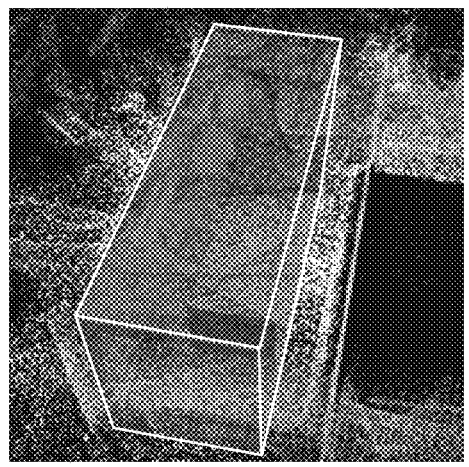
Figure 9G:
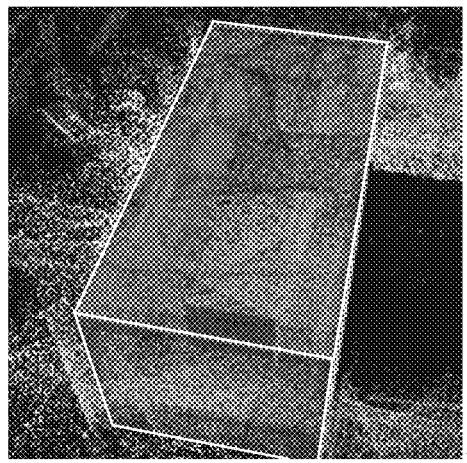
Figure 9H:
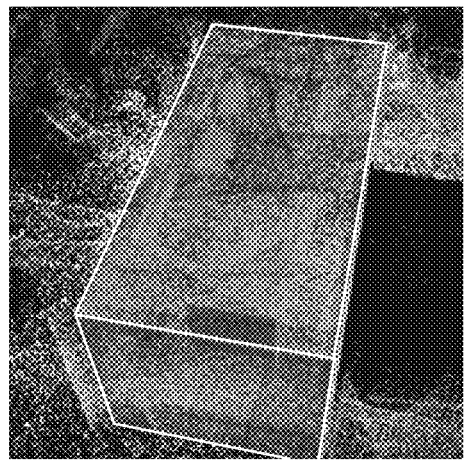

An example, of the process of growing seed volumes is shown in FIGS. 9A to 9H. In particular, an initial seed volume shown in FIG. 9A is positioned coincident with the path traversed by the sensing device 120. The seed is initially grown downwardly along a Z-axis, until a plane corresponding to the floor is reached. In this regard, this will be identified by termination of the rays in the ray cloud in a plane parallel to the Z-axis direction. Following this, the seed is then grown upwardly along the Z-axis, as shown in FIG. 9C, before being grown along the Y and X axes respectively, as shown in FIGS. 9D to 9H. This results in a volume being identified having boundaries coincident with the floor, walls and ceiling of the room, as shown in FIG. 9H, and as will be described in more detail below.

At step 560, it is determined if all the seeds are completed, in particular whether all seeds are grown and/or combined to the extent possible, and if not the process continues. Otherwise, at step 565, the processing system 310 uses the empty volumes defined by the grown seeds to create a geometric model of the structure, an example of which is shown in FIGS. 10A to 10D.

Figure 10A:
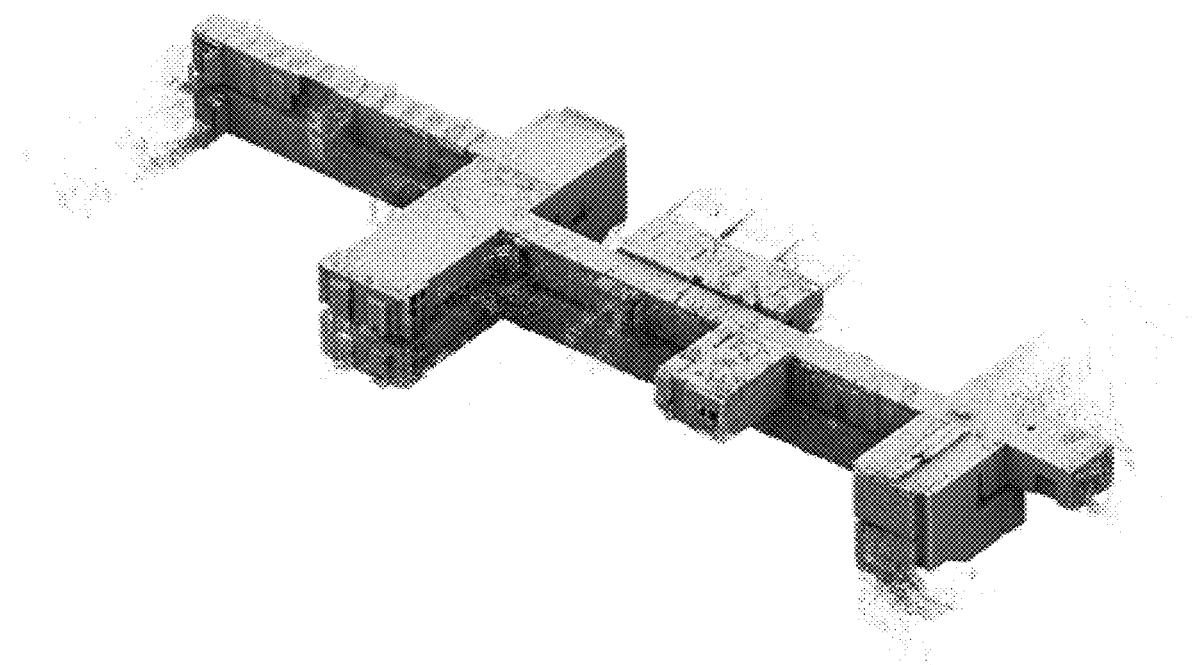
FIG. 10A is a schematic diagram of a perspective view of an example of a point cloud model.
Figure 10B:
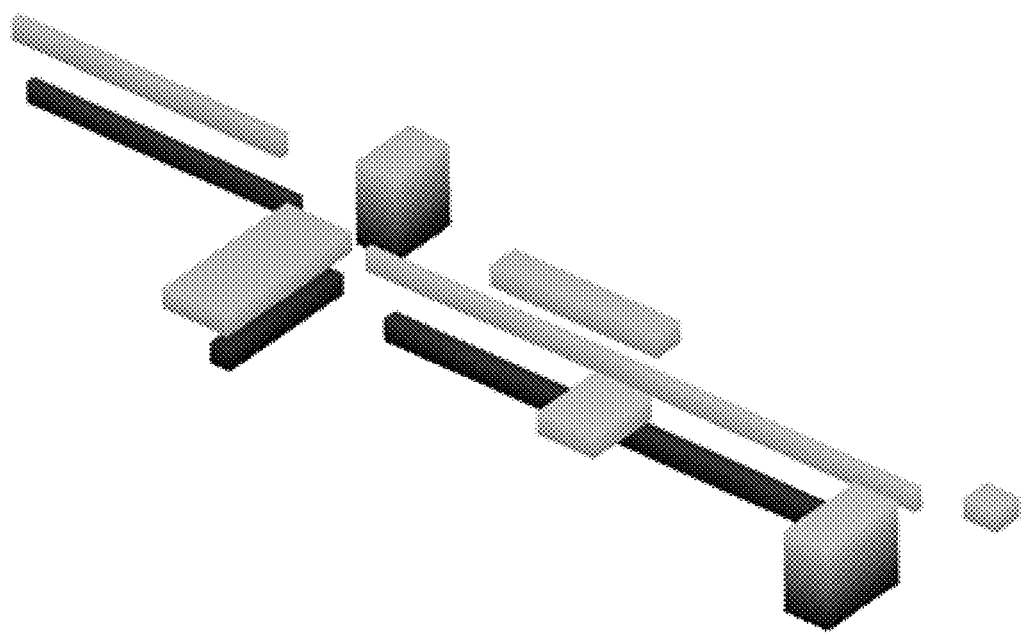
FIG. 10B is a schematic diagram of a perspective view of example model features.
Figure 10C:
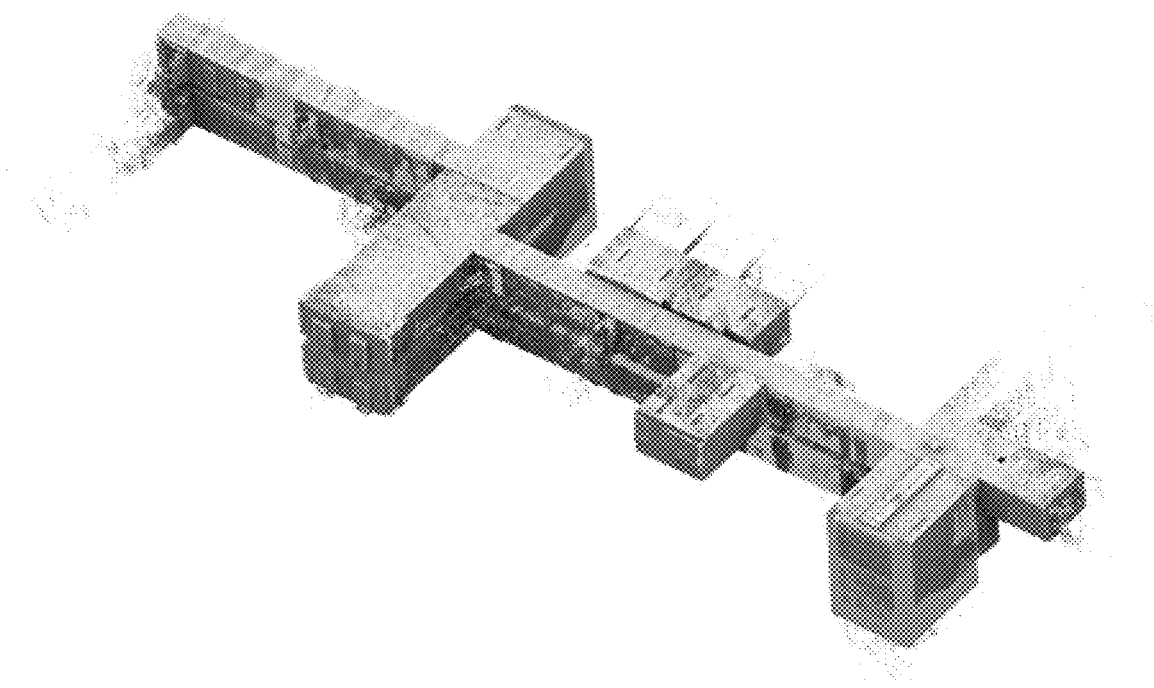
FIG. 10C is a schematic diagram of a perspective view of the model features of FIG. 10B overlaid on the point cloud model of FIG. 10A.
Figure 10D:
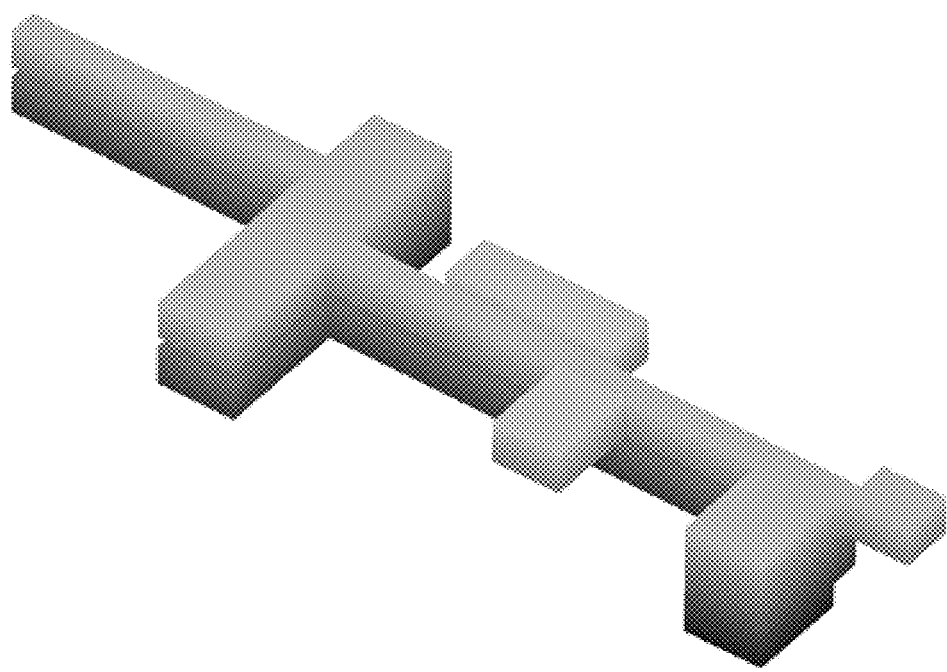
FIG. 10D is a schematic diagram of a perspective view of an example of a three-dimensional geometric model of the structure generated for the point cloud of FIG. 10A.

In this regard, analysis of the point cloud model shown in FIG. 10A results in identification of a number of structural features, corresponding to respective volumes, shown in FIG. 10B. The structural features are shown aligned with the point cloud model in FIG. 10C, and can be combined to create a geometric model shown in FIG. 10D. The geometric model of the structure includes walls, floors and other internal surfaces of the building and therefore typically consists of a number of interconnected planes, meaning that the geometric model of the structure is very basic and requires little data to define.

Figure 11A:
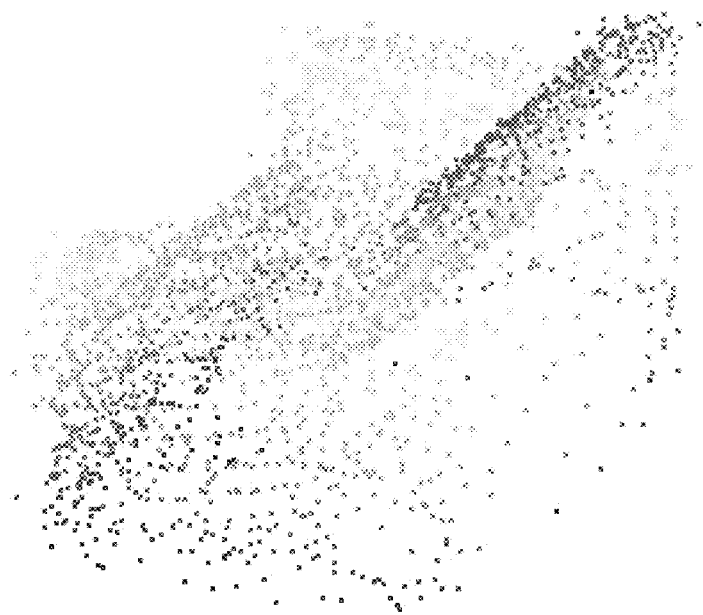
FIG. 11A is a schematic diagram of a perspective view of a point cloud model of a chair.
Figure 11B:
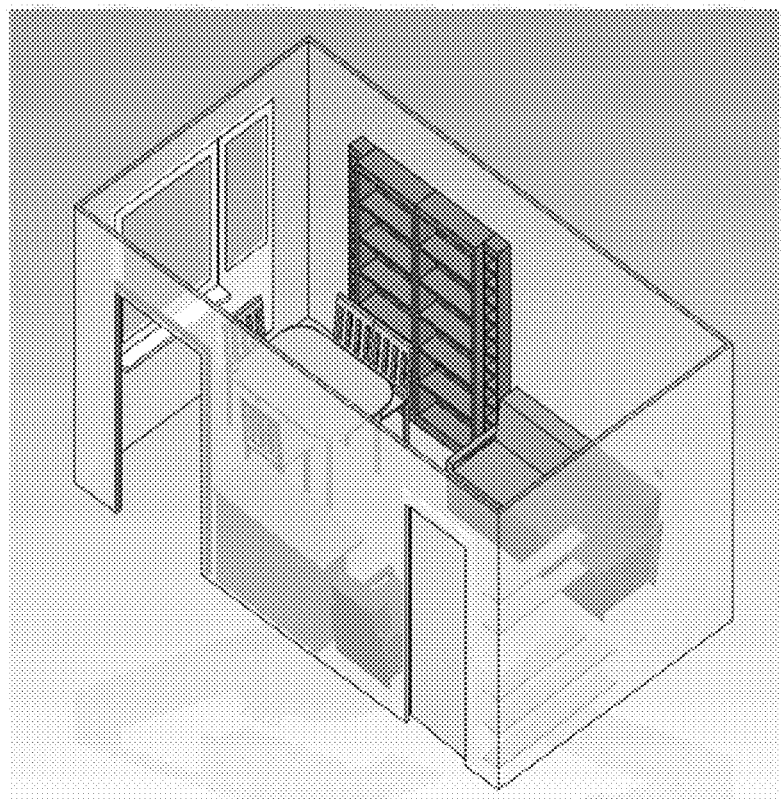
FIG. 11B is a schematic perspective view of a model of a room incorporating a number of objects; and, FIG. 12 is a schematic plan view of an example of semantic labelling of features of interest within a point cloud model.

Additional processing can then be performed to identify other objects within the point cloud model. An example of the point cloud for a chair is shown in FIG. 11A. In this regard, at step 570 some or all of the geometric model can be subtracted from the point cloud model to thereby leave any remaining parts of the point cloud, allowing these to be identified as objects within the building structure at step 575. In this regard, whilst extracting all parts of the point cloud corresponding to the geometric model can be performed, this is not essential, and indeed, leaving part of the point cloud can assist in identifying objects. For example, parts of the point cloud corresponding to the floor could be retained. This allows a gravity vector within the point cloud to be determined, allowing the point cloud to be analysed to identify objects located on the floor, as well as to assist with orientating identified objects.

At step 580 it is determined if any annotations are associated with these objects. Thus, when in the vicinity of a table or chair, a user can annotate the object with the word "table" or "chair", respectively, with this being used to assist in resolving the nature of the object. As previously described other forms of annotation could also be used.

In particular, at step 585 a search is performed of a database of predefined model components, such as CAD model elements, corresponding to respective objects to determine the object can be matched to a predefined model component. In the event that the object is not associated with an annotation, then the search may need to be performed against the entire database. However, if annotations are provided, these can be used to narrow the search space to model components relevant to the annotation. Thus, for the above example, the search could be limited to model components of tables or chairs, respectively.

The model components are compared to the point cloud of the object, and once a match is identified, the model component can be added to the geometric model, for example to replace the corresponding part of the point cloud model.

This process is repeated until all objects are completed, at which point these can be added to the geometric model of the building at step 595 and as shown in FIG. 10B, allowing a geometric model of the building interior including CAD models of fixtures and fittings to be created.

Once this is completed, it will be appreciated that the geometric model can be manipulated as required, for example by adding, removing, replacing features or the like, allowing this to be used for a wide range of applications, such as planning building interiors, or the like.

Further details of specific implementation details will now be described.

The challenge of concurrently building a map and estimating the trajectory of the device in an unknown environment, without an external reference system, is a known problem in the robotics community, called Simultaneous Localization and Mapping (SLAM). Given the trajectory from the SLAM solution, range measurements can be projected into a common coordinate frame to generate an accurate and consistent 3D point cloud model of an environment. To accomplish this, the algorithm analysing captured range measurements must estimate the six degrees of freedom trajectory of the scanner from the available sensor data, such as range, inertial data and/or optical data. This open loop trajectory estimation is likely to drift over large datasets, which results in misalignments in the 3D point cloud. To eliminate these drift errors, a global registration algorithm is applied to produce a globally consistent closed loop trajectory by identifying and aligning common surfaces from the point cloud. However, if the drift error of the open loop trajectory is too large for the global optimisation to converge, a place recognition step is required. This step matches regions that are mapped more than once in the dataset and therefore provides coarse alignment to the trajectory in order to initialise the global registration process.

Semantic Annotation of Georeferenced Environments (SAGE) refers to the use of a portable 3D mapping system and associated audio capturing system such as a smartphone, or other suitable acquisition system as previously described. The human-centric system enables an operator to verbally describe the environment while mapping it. Once the environment has been mapped, the annotations provided by the operator can be processed and positioned in the 3D point cloud at the location in which they were captured by the system.

The above described system employs a speech capturing algorithm in order to record the operators' speech while mapping an environment. The algorithm adapts based on background noise and the phone microphone sensitivity. Employing this algorithm means that raw audio can be captured on an smartphone efficiently, without running into storage and memory issues.

Once mapping is complete, and a resultant point cloud has been generated, voice recognition is used to parse all the operators' captured speech snippets. After this, trajectory data is used to find the location that each snippet was spoken within the point cloud. Once complete, the annotations can be positioned in the point cloud at the location in which they were spoken in the real world, as shown in FIG. 6B.

The smartphone typically implements software to acquire the operators' speech during a scan without the need for interaction. In this regard, the software typically adapts to different background noise conditions, and can provide audio and vibrotactile feedback to the operator about the performance of the system. The smartphone may be attached to the operator's arm or wrist for hands-free speech acquisition, or hands free recording devices, such as Bluetooth headsets, could also be utilised.

Audio data for an entire time period of a building scan can be captured, with a batch algorithm being used in order to extract speech from raw audio data. Alternatively, data could be captured in response to an external trigger, or could be processed in overlapping batches.

When performing extraction of the structure from the acquired point cloud data, the system extracts axis aligned rectilinear rooms from within point clouds, representing buildings. This process is performed using a volumetric expansion algorithm using time stamped point cloud and trajectory data, and optionally time stamped annotations provided by SAGE, which are positioned within the point cloud at the position they were spoken in the real world.

Using the trajectory, and where available, annotations, this allows the volumetric expansion algorithm to ignore objects (such as furniture within a room, etc.) and fit only to the structure of a room, even if the structure is largely occluded by objects. Rather than using the points contained in a point cloud to identify structural elements, the algorithm instead uses ray clouds and empty space.

The algorithm functions by first generating a number of seed volumes. These seed volumes provide the basis for the volumetric expansion algorithm and are initially considered as empty space. Each of the faces of the seed volumes are then iteratively expanded to fit the room by leveraging the available rays. If a volumetric region within a ray cloud has rays passing through it, but no rays ending within it, the region is empty space and must still be within a room. If a region has no rays within it, then it is not part of the observed space and must be outside of a room. If a region has rays passing through it and rays ending within it, the region must contain objects (which may be a wall, floor, ceiling or object).

The volumetric expansion algorithm also leverages the unique co-existence of humans and machines. Real time semantic information provided by the operator is captured using SAGE and used to aid in the structure extraction process. This is accomplished by allowing the operator to freely talk during a scan. Due to the portable nature of the Zebedee and SAGE systems, annotations, such as speech snippets and the position in which they lay within a point cloud, can be used in interpreting the point cloud model. In one example, this is used to infer points of interest within a point cloud. These points of interest can then be used to create seeds to begin the expansion algorithm. Since the device is hand-held, an appropriate assumption would be that the seeds are considered empty space (since that is where the operator was standing).

Not only can individual seeds be found, but large seeds can be generated by combining multiple annotations. By using the operators' speech as an identifier, the operator is able to generate multiple annotations within a single room. If the operator provided the speech "room one" in one corner of a room, and "room one" in the opposite corner of the same room, the algorithm is able to match these like annotations. After matching these annotations, the algorithm is able to form a large seed encompassing all like markers. This method effectively crops out (or removes) a large section of the point cloud. If a large table were in the middle of the room, it would be ignored as it is now contained within the large seed (which is considered empty space). As a result, the volumetric expansion algorithm is not likely to falsely detect the surface of the large table as a floor or ceiling.

Furthermore, semantic information provided by the operator can be used to identify certain structural elements that may be difficult to extract. Examples of these structural elements include corridors and stairwells. This information can be used to assist the algorithm in extracting these specific elements by adjusting certain parameters of the algorithm based on the type of structural element.

This co-existence of humans and machines can aid in the structure extraction process without requiring manual human intervention. The sections below further outline the implementation of the volumetric expansion algorithm along with the integration of SAGE.

The volumetric expansion algorithm works by generating a ray cloud with each ray consisting of a start point (from the LiDAR scanner) and an end point (where an object is hit). Rays can be generated using time stamped trajectory and point cloud data. Ray start points are points that are contained within the trajectory, whereas ray end points consist of every point within the point cloud. Since the point cloud and trajectory are time stamped, linear interpolation is used to find ray start positions that match the respective end position timestamps.

Rather than using the points in a point cloud to identify a wall, floor or ceiling, the algorithm instead uses rays and empty space. The philosophy behind this is that best fit volumes are more robust than best fit planes; while multiple detected planes can identify a room, it doesn't follow that all or most rooms can be identified by detecting planes. Many wall, floor and ceilings surfaces are obscured by furnishings, such as book cases, curtains, doors, lights and the like. Moreover, many planes do not identify room boundaries, such as partition walls, table surfaces and cabinets. By contrast, best fit volumes can expand through furniture occluding walls, floors and ceilings in order to correctly model rectilinear rooms. If a volumetric region has no rays within it, then it is not part of the observed space and must be outside of a room. Using this approach, ray occupancy is used to help distinguish between the boundaries of a volume such as a room, and the false-positive surfaces of interior objects.

Once the rays are generated, the algorithm calculates normals of every point within the point cloud. This is accomplished by employing a K nearest neighbour algorithm. This approach takes the K nearest neighbours of a point, fits a plane to these points and calculates the normal of the plane. This normal is then assigned to the point. Once all normals have been estimated, the primary coordinate frame is found using the normals. This is accomplished by clustering the normals and finding the dominant bearing, modulo 90 degrees. It is assumed that the vertical direction is known relative to the 3D map. All rays are then reoriented so that the entire ray cloud becomes axis aligned.

After the ray cloud has been axis aligned, seed selection can begin. The algorithm works by first generating a number of seed cuboids of a defined size. In one example the seed cuboids are 50×50×50 cm in size, with the region contained within these cuboids being considered empty space. Whilst these seed cuboids can be generated by choosing random positions within the ray cloud, this can also be achieved by iterating through the trajectory data in order to generate seeds. The algorithm chooses seeds that are spaced apart and not overlapping one another.

Initially seeds are positioned by calculating the distance between a current trajectory point and the centre of a previous seed. If this distance is too small, the algorithm will move on to the next point (the algorithm uses a subset of these trajectory points so may skip a number of points when selecting the next point). If the distance is large enough, the algorithm performs a final check to ensure the seed does not intersect any other seed that has already been chosen. The results of this seed selection can be seen in FIG. 8, with the cuboids representing the seeds that were chosen.

Once the seed selection process is complete, the algorithm can begin searching for rooms, by expanding each face of the seed volume. As part of this process, the processing device examines rays intersecting the seed volume, and then grows the seed volume along a working axis perpendicular to the seed volume face, using rays that point in this direction.

In large rooms, biasing occurs for walls, floors and ceilings closer to the trajectory. This is due to the fact that these walls are more densely populated with ray end points. To avoid this biasing, rays are treated as expanding cones. Rather than using a count to track the number of rays ending within the search box, cross sectional area is used. As such, the farther along the ray, the more weight it has. This cross sectional area is modelled using a standard quadratic equation in a global coordinate space, allowing the processing device to examine the cross sectional area along the working axis as it extends away from the seed volume face.

In this regard, the processing device examines drops in the cross sectional area and if this exceeds a threshold change, the processing device will stop growing the volume in that direction to prevent the expansion of the volume past valid walls.

This is then repeated for each face of the volume, with the process iterating a number of times until each face is stationary, at which point the extents of a room are deemed to be found.

While the as described above can function adequately, it can be hampered by poor seed selection, which can result in rooms being misinterpreted and therefore provides incorrect results.

To overcome this limitation, SAGE can be employed to assist with seed selection. SAGE is able to provide positioned annotations within a point cloud at the location in which they were spoken in the real world, allowing seeds to be created based on operator defined information collected concurrently with data acquisition. Thus, rather than picking random points along the trajectory to spawn seeds, SAGE annotations can be used as markers to create seeds. In this way, an operator can mark rooms and seed positions whilst scanning an environment.

The first step in this process is to map an environment with the aid of SAGE, using the captured audio data to create annotations. Due to the portable nature of sensing devices such as Zebedee (the 3D mapping system used in this work) and SAGE systems, it is also possible to make further assumptions about annotations and their position within a point cloud.

For example, when used in a hand-held configuration, an appropriate assumption is that the Zebedee device is approximately 100 cm off the ground, although this parameter can be changed to accommodate for the height of the operator. Since the operator is walking with the device, it is then safe to assume that the area between the device and 100 cm below does not contain a wall, floor or ceiling, and can be considered empty space. Since the device roughly takes the height of the operators' shoulder, it is also safe to assume that 20 cm above the device is empty space. So long as the operator does not approach walls while annotating to the system, a further assumption can be made that 15 cm either side of the device is empty space. All of these assumptions together allow for the generation of large seeds at SAGE annotation positions.

To leverage the size of these seeds, and the assumption that the region within these seeds is empty space, the expanding cuboid must always encompass its original seed. This means that a final extracted room can be no smaller than the original seed and must encompass the original position of the seed. Due to this, the algorithm is unlikely to misinterpret large planar objects within a room as a floor or ceiling. Since the bottom of the seed is most likely below any large planar surfaces such as tables, the algorithm is not likely to incorrectly fit the cuboids' lower face to these surfaces. Likewise, since the top of the seed is most likely above these surfaces, the algorithm is not likely to incorrectly fit the top face to these surfaces. Thus, if a large seed is used, it is likely that the upper and lower faces of the seed would be above and below objects, and hence would not incorrectly classify furniture, such as chairs and tables as a ceiling or floor.

Furthermore, with the integration of SAGE, it is possible to know the locations of all seeds before the expansion process begins. As such, the algorithm is able to approach the problem in a more complete manner.

In this regard, in the above methodology, the algorithm processed one seed at a time before moving onto the next. The algorithm must perform this way as multiple seeds can be contained within a single room. If an iterative approach was used, there could potentially be hundreds of seeds all attempting to fit a single room. If the cuboids were to interact with one another by creating virtual walls (at the faces of the cuboids), over segmentation may occur. Conversely, if seeds were not to interact with one another, and were allowed to expand through each other without penalty, there is still no way of determining which of the possible hundreds of solutions are correct.

With the integration of SAGE, it can be assumed that only the appropriate number of seeds required to successfully model a room are provided. Due to this assumption, and the fact that the number of seeds are known, an iterative approach can be used. This approach performs the first face expansion on the first seed, and then moves on to all other seed cuboids. Once complete, it then performs the face expansion process on all other axes.

An iterative approach allows the cuboids to compete with one another for space. When an expanding cuboid has converged (stationary cuboid that the algorithm has determined to be a room) or a face is moved, the rays intersecting the cuboid are cropped (cut in order to terminate at the intersection), thus creating a virtual wall. This virtual wall helps to stop the cuboids from expanding through one another. If a large cuboid were to expand through a smaller cuboid to find its best fit, the smaller cuboid may move its face back, flush with the large cuboid on the next expansion iteration. This is because the point it was previously positioned at is now considered empty space (since it is contained within the large box).

With the iterative approach however, the cuboids have a chance to compete for the best fit. In this way, the system functions in a more uniform and complete way.

Furthermore, with the integration of SAGE, speech can be used to assign semantic data to seeds. Structural elements such as stairways and corridors can be identified whilst scanning an environment using SAGE. This semantic data can then be used to adjust algorithm properties. If a token of speech such as "corridor", "hallway" or "stairwell" is found, a flag can be set on the seed that is created at the position of the annotation. Seed positioning and/or growth can then be tailored based on understood geometric properties of specific structural features.

For example, in the case of a corridor marker, the algorithm is then able to change the order of expansion to suit this specific architectural element, so rather than initially performing expansions towards the floor and ceiling, the algorithm instead performs expansions along the corridor first. This can also employ modified threshold parameters so that the algorithm is more sensitive and will detect a wall with a smaller relative drop in occupancy. After this, the algorithm determines the longest extent, which is assumed to be running down the length of the corridor. As such, the algorithm adjusts its parameters to become more sensitive when dealing with this axis (of the longest extent). By increasing the sensitivity in this axis, it is more likely for the cuboid faces to stop at a door frame rather than venturing into a room at the end of a corridor. All other axes are treated normally with default parameters.

In the case of stairwells, the algorithm decreases the sensitivity in the vertical direction. By decreasing the sensitivity, expansion is able to penetrate through winding staircases up a stairwell. This prevents the algorithm from falsely positioning a face on the large planar surface of a staircase level. The perpendicular horizontal axes are treated normally with default parameters. When processing stairwells, the algorithm also modifies the order of expansion. It first performs the expansion process on the horizontal axes before moving onto the vertical axis.

The introduction of semantic annotations provided by SAGE, also allows the system to make further assumptions in locating and growing seeds. In this regard, large seeds can be generated by combining multiple annotations by assuming like annotations are spoken within a single room, these annotations can be linked to create large seeds.

Thus, if an operator provided the speech "room one" in one corner of a room and "room one" in the opposite corner of the same room, the algorithm is able to match these two annotations. The algorithm then uses the minimum and maximum extents of all annotations in each axis to create a large seed cuboid encompassing both markers. The algorithm then applies the same assumptions to the seed as those stated previously. This provides a large seed that is at least 120 cm tall (with default parameters) and encompasses all markers. This large seed effectively removes a large section of the ray cloud.

This multi-seed technique becomes advantageous in many situations. For example, if a large, flat object such as a table is present in the middle of the room, it would be ignored by the algorithm as the object is now contained within the large seed (considered empty space). As a result, the algorithm cannot misinterpret the object as a floor or ceiling, and has a greater chance of correctly fitting the room. Additionally, this technique enables operators to react to dynamic events (such as humans walking past while an operator is mapping an environment), which may be difficult to identify using post processing techniques. Operators are then able to crop out these dynamic events, thus preventing the structure extraction algorithm from incorrectly classifying these regions as structural elements.

The multi-seed technique can be applied to any number of like annotations, with two markers being the minimum. If any of the markers with like annotations contain any semantic data (corridor, stairwell, etc.), this semantic data is also passed onto the final seed. This means that a stairwell named "stairwell one" can be represented with a number of "stairwell one" annotations in order to form a large seed. Since the annotations contain the term "stairwell", the final seed is considered to be in a stairwell and will be processed as discussed previously.

It will be appreciated from the above that position and orientation of the trajectory and annotations within point clouds can significantly assist in interpreting point clouds.

Figure 12:

In addition to using annotations to identify structural features, annotations can also be used to highlight other features of interest, such as areas where action is required, and an example of this is shown in FIG. 12.

In this example, a list of keywords can be defined, with each being associated with respective priorities, which can be represented using colour-coded regions. An operator uses a set of predefined words for assigning priorities to each annotation. In this example, operators used a predefined wordlist containing the words good, low, medium, high and hazardous. These words represent low to high priority tasks respectively, and are followed by location specific annotations. Once the speech annotations were converted to text, string matching was used in order to compare the annotations with the predefined dictionary of priorities. If an annotation contained any word from the word-list, the region around the annotation was coloured based on its priority. This feature provided an additional semantic layer to the data, by assigning different colours to regions around each annotation in a 3D point cloud, based on their content. Later, the operator could quickly detect and locate crucial or hazardous regions (in this example red regions) based on their coded colours, in conjunction with text annotations within the generated point cloud.

The advantage of this system is that an operator is able to easily capture dynamic events occurring in an environment that may otherwise be difficult to identify using other post processing techniques. FIG. 12 presents an example of this with the hazardous region labelled "fridge leak". This leak would be difficult to identify using post processing techniques on the point cloud alone. SAGE provides an easy and fast method of identifying dynamic events.

Accordingly, the above described techniques include using trajectory based seeding using non-intersecting seeds from trajectory data to start the expansion process, a single-seed technique, leveraging SAGE for seed selection and a multi-seed technique that incorporates all functionality of the single-seed technique, whilst also combining annotations to create large seeds.

Experiments performed using each of these techniques demonstrate significant improvements in accuracy compared to traditional point cloud processing techniques, with improved results including greater accuracy and reduce processing time being obtained for the single-seed and multi-seed approaches.

These data demonstrate that the single-seed and multi-seed techniques are more efficient, primarily due to the enhanced quality of seeds and the fact that the trajectory-seed technique may choose an arbitrary number of seeds until it finds a stationary cuboid modelling a room.

Accordingly, the above data highlight that taking into account semantic information acquired during capture of a point cloud, this can increase the accuracy and robustness of point cloud interpretation, and in particular the extraction of structural and other features. The semantic information can include the trajectory taken by a sensing device while the user travels through the building. Furthermore, greater improvements can be achieved by collecting additional vocalisations from the user, leveraging the ability of the user to recognise and describe features of a building's structure and content, allowing the system to operate at an even higher rate of accuracy.

In particular, by drawing semantic data from the environment during a scan, this can be used to vastly improve the seeding process used in the identification of model features. This allows the system to dynamically adjust parameters to aid in correctly extracting the specific architectural elements. Additionally, the system is particularly beneficial in the areas of object segmentation, extraction and recognition. In this regard, once walls, floors and ceilings have been successfully extracted, object extraction and recognition may become an easier task. When the structure of a point cloud has been successfully extracted and removed, only objects within the environment remain, allowing these objects to be more easily extracted, segmented and analysed, with this process also being enhanced through the use of appropriate semantic information.

Whilst this can be used in a wide range of scenarios, this is particularly useful in developing Building Information Models (BIM), and other related applications, in which it is useful to be able to dynamically scan a building interior and generate a useable computer model.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A system for generating a three-dimensional geometric model of a structure, the system including:
   a) a portable sensing device that can be transported through the structure, wherein the sensing device includes one or more sensors that generate sensor data at least partially indicative of a position of the sensing device relative to at least part of the structure;
   b) at least one electronic processing device that:
      i) determines a captured map of at least part of the structure using the sensor data;
      ii) determines at least part of a path traversed by the sensing device using the sensor data;
      iii) identifies one or more model features using the part of the path and the captured map at least in part using a volume growing process; and,
      iv) generates a three-dimensional geometric model of the structure using the model features;
      wherein identifying the one or more model features includes:
         (1) generating a number of seed volumes by defining the seed volumes along at least part of the path;
         (2) at least one of growing and combining the seed volumes to determine empty volumes; and,
         (3) using the empty volumes at least in part to identify model features.

2. The system of claim 1, wherein the at least one processing device
   defines at least one of a position, shape, location, orientation, size and number of seed volumes.

3. The system of claim 1, wherein the at least one electronic processing device performs the volume growing process at least one of:
   a) in a ray cloud model of at least part of the structure;
   b) to form empty volumes having boundaries coincident with model features; and,
   c) in accordance with at least one of:
      i) a point of interest within the structure;
      ii) analysis of at least part of the path; and,
   d) user defined annotations.

4. The system of claim 3, wherein the captured map is a point cloud model, and wherein the at least one electronic processing device creates a ray cloud model using the point cloud model and at least part of the path.

5. The system of claim 4, wherein the at least one electronic processing device:
   a) uses the sensor data to determine:
      i) captured points in the structure to thereby generate the point cloud model; and
      ii) a position and orientation of the sensing device relative to the structure to thereby determine the path relative to the point cloud model; and,
   b) creates the ray cloud model based on the position and orientation of points in the point cloud and the position and orientation of the sensing device on the path when the respective point in the point cloud was captured.

6. The system of claim 3, wherein the point of interest is indicative of at least one of:
   a) an extent of at least one of a structural feature and object; and,
   b) a type of at least one of a structural feature and object.

7. The system of claim 1, wherein at least one of:
   a) the sensor data is indicative of at least one of:
      i) a range of at least part of the structure from the sensing device;
      ii) an orientation of the sensing device; and,
      iii) a position of the sensing device; and,
   b) the sensor includes at least one of:
      i) a laser range finder;
      iii) an optical imaging device, and,
      iii) an inertial sensor.

8. The system of claim 1, wherein the model features are indicative of at least one of:
   a) structural features including at least one of:
      i) structure boundaries;
      ii) structure surfaces; and,
      iii) structure volumes; and,
   b) objects associated with the structure.

9. The system of claim 1, wherein the at least one electronic processing device:
   a) identifies structural features within the captured map; and,
   b) identifies objects associated with the structure at least in part using at least one of:
      i) structural features within the captured map;
      ii) points of interest within the captured map; and,
      iii) user defined annotations.

10. The system of claim 9, wherein the at least one electronic processing device at least one of:
    a) identifies objects by:
       i) removing at least part of the captured map corresponding to at least some structural features from the captured map; and,
       ii) identifying objects from remaining parts of the captured map; and,
    b) identifies objects by:
       i) determining at least part of the capture map corresponding to an object;
       ii) determining a user defined annotation associated with the at least part of the captured map; and,
       iii) using the annotation to identify the objects.

11. The system of claim 9, wherein the at least one electronic processing device:
    a) determines a gravity vector orientation with respect to the captured map using at least one structural feature; and,
    b) identifies objects at least in part using the gravity vector.

12. The system of claim 1, wherein the at least one electronic processing device identifies surfaces within defined distances of the path to identify at least one of floor, ceiling and wall planes.

13. A method for generating a three-dimensional geometric model of a structure, the method including:
    a) obtaining, from a mobile sensing device transported through the structure, sensor data at least partially indicative of a position of the sensing device relative to at least part of the structure; and,
    b) in at least one electronic processing device:
       i) determining a captured map of at least part of the structure using the sensor data;
       ii) determining at least part of the path traversed by the sensing device using the sensor data;
       iii) identifying one or more model features using the part of the path and the captured map at least in part using a volume growing process; and
       iv) generating a three-dimensional geometric model of the structure using the model features;
       wherein identifying the one or more model features includes:
          (1) generating a number of seed volumes by defining the seed volumes along at least part of the path;
          (2) at least one of growing and combining the seed volumes to determine empty volumes; and, (3) using the empty volumes at least in part to identify model features.

14. A system for generating a three-dimensional geometric model of a structure, the system including:
    a) a portable sensing device that can be transported through the structure, wherein the sensing device includes one or more sensors that generate sensor data at least partially indicative of a position of the sensing device relative to at least part of the structure;
    b) an input associated with the portable sensing device that receives annotations indicative of points of interest as the user traverses the path; and,
    c) at least one electronic processing device that:
        i. acquires the annotations and the sensor data;
        ii) determines a captured map of at least part of the structure using the sensor data;
        iii) determines at least part of a path traversed by the sensing device using the sensor data;
        iv) generates annotation data indicative of the points of interest based on the path traversed by the sensing device and the annotations acquired;
        v) identifies one or more model features using the part of the path, the captured map and the annotation data; and,
        vi) generates a three-dimensional geometric model of the structure using the model features.

15. The system of claim 14, wherein the annotation data is indicative of a point of interest identifier and point of interest location.

16. The system of claim 15, wherein the input includes a microphone that generates audio data indicative of utterances of the user, and wherein the at least one electronic processing device uses the audio data to determine annotation data.

17. The system of claim 16, wherein the at least one electronic processing device uses speech recognition to determine a point of interest identifier and sensor data captured simultaneously with the audio data to determine a point of interest location.

18. The system of claim 15, wherein the at least one processing device at least one of:
    a) uses the annotation data of one or more annotations to determine an extent of a point of interest, and,
    b) uses the point of interest identifier to identify a corresponding model feature.

19. The system of claim 18, wherein the at least one processing device:
    a) determines a model component using the point of interest data; and,
    b) incorporates the model component into the geometric model of the structure as a model feature.

20. The system of claim 19, wherein the at least one electronic processing device:
    a) uses a point of interest identifier to select a number of model components;
    b) compares the model components to the captured map; and,
    c) substitutes at least part of the captured map for one of the model components.

21. A method for generating a three-dimensional geometric model of a structure, the method including:
    a) obtaining, from a mobile sensing device transported through the structure, sensor data at least partially indicative of a position of the sensing device relative to at least part of the structure; and,
    b) receiving annotations, from an input associated with the sensing device, indicative of points of interest as the user traverses the path; and
    c) in at least one electronic processing device:
        i) acquiring the annotations and the sensor data;
        ii) determining a captured map of at least part of the structure using the sensor data;
        iii) determining at least part of the path traversed by the sensing device using the sensor data;
        iv) generating annotation data indicative of the points of interest based on the path traversed by the sensing device and the annotations acquired;
        v) identifying one or more model features using the part of the path, the captured map and the annotation data; and,
        vi) generating a three-dimensional geometric model of the structure using the model features.

* * * * *